(12) United States Patent
Kaneko

(10) Patent No.: US 6,603,522 B1
(45) Date of Patent: Aug. 5, 2003

(54) LIQUID CRYSTAL SHUTTER

(75) Inventor: Yasushi Kaneko, Sayama (JP)

(73) Assignee: Citizen Watch Co., Ltd., Tokyo (JP)

( * ) Notice: Subject to any disclaimer, the term of this patent is extended or adjusted under 35 U.S.C. 154(b) by 232 days.

(21) Appl. No.: 09/831,329

(22) PCT Filed: Sep. 7, 2000

(86) PCT No.: PCT/JP00/06107

§ 371 (c)(1),
(2), (4) Date: May 8, 2001

(87) PCT Pub. No.: WO01/18593

PCT Pub. Date: Mar. 15, 2001

(30) Foreign Application Priority Data

Sep. 9, 1999 (JP) ............................................. 11-255086
Sep. 21, 1999 (JP) ........................................... 11-267216

(51) Int. Cl.⁷ ............................................ G02F 1/1335
(52) U.S. Cl. ........................ 349/117; 349/118; 349/119; 349/121
(58) Field of Search ................................ 349/117, 118, 349/119, 121

(56) References Cited

U.S. PATENT DOCUMENTS

| | | | | |
|---|---|---|---|---|
| 5,619,356 A | * | 4/1997 | Kozo et al. | 349/99 |
| 6,307,608 B1 | * | 10/2001 | Sakamoto | 349/119 |
| 6,373,541 B1 | * | 4/2002 | Sekime et al. | 349/117 |
| 6,480,251 B1 | * | 11/2002 | Yamaguchi et al. | 349/119 |

FOREIGN PATENT DOCUMENTS

| | | |
|---|---|---|
| JP | 06003665 A | 1/1994 |
| JP | 06301027 A | 10/1994 |
| JP | 08015695 A | 1/1996 |
| JP | 08043787 A | 2/1996 |
| JP | 08050206 A | 2/1996 |
| JP | 08160383 A | 6/1996 |
| JP | 10073797 A | 3/1998 |

\* cited by examiner

Primary Examiner—Alexander Ghyka
(74) Attorney, Agent, or Firm—Finnegan, Henderson, Farabow, Garrett & Dunner, L.L.P.

(57) ABSTRACT

A liquid crystal shutter of this invention comprises a liquid crystal element holding a nematic liquid crystal, of 180° to 260° in twist angle, between a pair of substrates, a pair of polarizing plates sandwiching the liquid crystal element, and a retardation film inserted between the liquid crystal element and one polarizing plate. The angle formed by the absorption axes of the polarizing plates is set in the range of 80° to 100°, the angle formed between the absorption axis of one of the polarizing plates and the direction of the central liquid crystal molecule of the liquid crystal element is set in the range of 40° to 60°, and the delay axis of the retardation film is arranged substantially parallel to the alignment direction of the central liquid crystal molecule of the liquid crystal element. Further, the retardation film is arranged on a discotic film at an inclination angle varying along thickness in such a manner that the alignment direction of the retardation film is substantially orthogonal to the direction of the central liquid crystal molecule. Furthermore, the liquid crystal shutter comprises a first retardation film and a second retardation which are, for example, aligned on the retardation film with an inclination angle varying along the thickness thereof (FIG. 1).

12 Claims, 11 Drawing Sheets

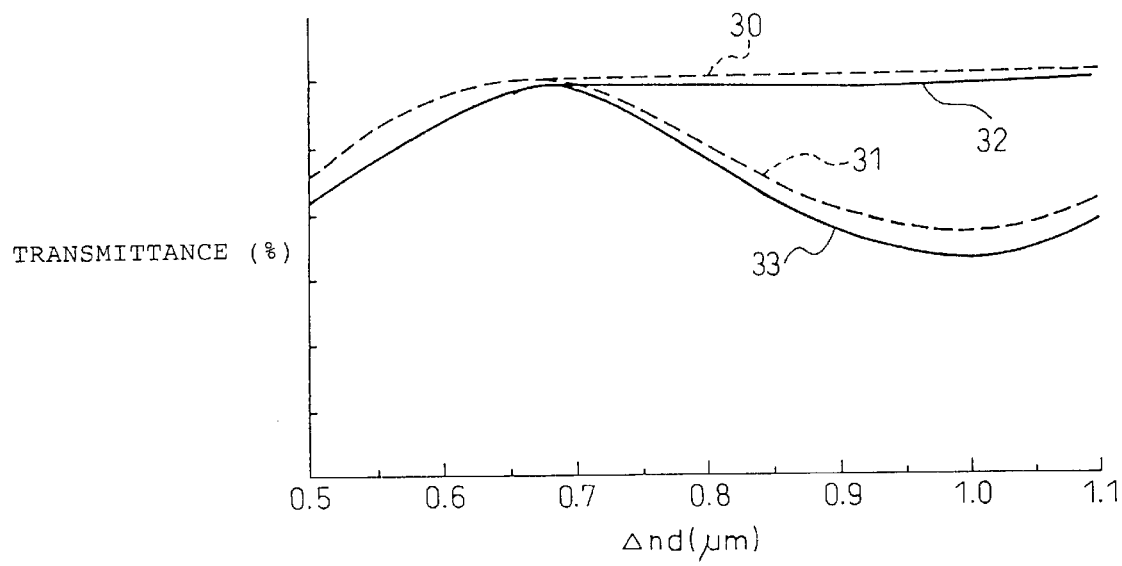
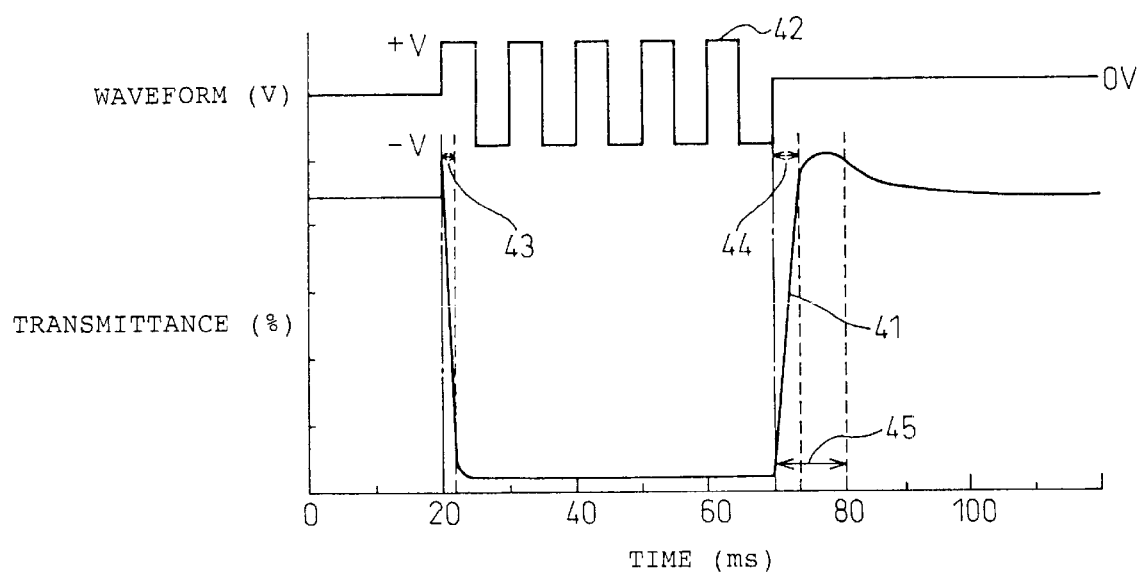

LIQUID CRYSTAL SHUTTER

TECHNICAL FIELD

The present invention relates to a liquid crystal shutter or, in particular, to a liquid shutter in which the peripheral circuit or especially the drive circuit can be simplified and the cost and power consumption can be reduced by realizing a low-voltage drive, a high-speed shutter on-off response, a high contrast, etc. The liquid crystal shutter according to this invention has the various advantages as described above, and therefore can find application in various fields such as battery-driven portable equipment, liquid crystal photoprinters and liquid crystal optical elements.

BACKGROUND ART

Conventionally, various liquid crystal shutters have been proposed. Their performance, however, is not yet satisfactory, and market demand is high for a liquid crystal shutter for a liquid crystal printer or a liquid crystal optical element high in response speed, bright, high in contrast, drivable by a simple method and capable of a gradated display.

The liquid crystal shutters under development are roughly classified, according to the type of the liquid crystal material used, into (1) a liquid crystal shutter using an ordinary nematic liquid crystal, (2) a liquid crystal shutter using a two-frequency drive nematic liquid crystal having positive or negative dielectric constant depending on the frequency, and (3) a liquid crystal shutter using a ferroelectric liquid crystal having a spontaneous polarization.

The liquid crystal shutter using the ordinary nematic liquid crystal in (1) above is further divided, according to the operating principle, into two well-known types including (a) a TN (twisted nematic) liquid crystal system in which white or black is displayed by use of the property of the optical rotatory power rotating the incident light, and the optical rotatory power is canceled by applying a voltage to the pixels and erecting the liquid crystal molecules at an angle substantially perpendicular to the substrate, and (b) a STN (super twisted nematic) liquid crystal system using a liquid crystal element having a twist angle of 180° to 260° in which black or white is displayed by applying a voltage to the pixels and thus changing the birefringence which causes a retardation of the incident light.

The prior art having the configuration described in (a) above is disclosed in, for example, Japanese Unexamined Patent Publication No. 62-150330. This conventional system is configured with a TN liquid crystal element having a twist angle of 90° and a pair of polarizing plates arranged on the two sides of the liquid crystal element in such a manner the absorption axes thereof are orthogonal to each other.

Another conventional system is disclosed, for example, in Japanese Unexamined Patent Publication No. 9-113864. In this prior art, which uses a liquid crystal element having a twist angle of 270°, polarizing plates are arranged parallel or perpendicular to the alignment direction of the upper and lower substrates thereby to utilize the optical rotatory power.

The conventional system of (b) described above includes a STN liquid crystal display apparatus called the yellow mode used as an ordinary liquid crystal display apparatus. In the conventional system such as the STN liquid crystal display apparatus having a twist angle of 240°, for example, the angles of intersection between the absorption axes of the upper and lower polarizing plates is about 60°, and the angle between the alignment direction of the substrates and the absorption axes of the polarizing plates is set to about 45°.

In the case where the a twist angle of 90° is used in the system of (a) above, the response time required to transfer from the open state to the closed state by applying a voltage is as short as several ms, while the problem is the slow response time of 10 to several tens of ms for returning from the closed state to the open state by removing the voltage. Further, in the case where the twist of 270° is used, the orientational stability of the liquid crystal element is difficult to achieve, which makes it impractically necessary to use an obliquely vapor deposited SiO film or the like special alignment layer capable of attaining a high pretilt.

In the system of (b), on the other hand, the use of a practical STN liquid crystal element having the twist angle of 225° to 250° can attain a short response time of several ms for transferring from closed to open state. In the closed state, however, a voltage is applied to the liquid crystal element to make a bluish black liquid crystal with a low contrast of about 10. In addition, a further increase in applied voltage undesirably increases the brightness again by changing the elliptical polarized state. Therefore, the applied voltage cannot be set to a very high level, with the result that the response time from open to closed state becomes as long as 10 to several tens of ms, thereby posing the problem of poor practicability as a liquid crystal shutter.

Further, based on the aforementioned study of the prior art, the present inventor has proposed a system using a liquid crystal element having a twist angle of 180° to 260°, as disclosed in Japanese Unexamined Patent Publication No. 9-119219, in which the birefringence is utilized for white display as in the STN liquid crystal system while the optical rotatory power is canceled for black display by erecting the liquid crystal molecules substantially perpendicular to the substrate.

Now, the system proposed by the present inventor will be explained with reference to FIGS. 11 and 12. FIG. 12 is a sectional view showing the structure of this liquid crystal shutter, and FIG. 11 is a plan view showing the alignment direction of liquid crystal molecules as viewed from the top in FIG. 12. This liquid crystal shutter, as shown in FIG. 12, has a liquid crystal element 10 having a twist angle of 240°, a lower polarizing plate 8 and an upper polarizing plate 9.

The liquid crystal element 10 is formed of a first substrate 1 of glass 0.7 mm thick with a first electrode 2 of ITO and an alignment layer 3 formed thereon, a second substrate 4 of glass 0.7 mm thick with a second electrode 5 of ITO providing a transparent electrode and an alignment layer 6 formed thereon, and a nematic liquid crystal 7. The birefringence index $\Delta n$ of the nematic liquid crystal 7 used in this case is 0.2, and the gap d between the first substrate 1 and the second substrate 4 is 4 $\mu$m. Therefore, the value $\Delta nd$ indicating the birefringence characteristic of the liquid crystal element 10 is set to 0.8 $\mu$m, The alignment layer 3 associated with the first substrate 1 is rubbed in the alignment direction of the lower liquid crystal molecules located on the boundary surface of the first substrate 1 arranged on the lower side, i.e. in the alignment direction 7b (See FIG. 11) of the lower liquid crystal molecule. The alignment layer 6 of the second substrate 4, on the other hand, is rubbed in the alignment direction of the upper liquid crystal molecules located on the boundary surface of the second substrate 4 located on the upper side, i.e. in the direction 7a (See FIG. 11) of alignment of the upper liquid crystal molecule. Further, a substance having an optically rotatory power called a chiral material is added to the nematic liquid crystal 7 having a viscosity of 18 cp, so that the twist pitch P is adjusted to 8 μm to obtain the relation d/P=0.5 thereby to form a liquid crystal element having a counterclockwise twist angle of 240°.

Also, the lower polarizing plate 8 and the upper polarizing plate 9 are arranged on the two sides, respectively, of the liquid crystal element 10 in such a manner that the absorption axis 8a of the lower polarizing plate and the absorption axis 9a of the upper polarizing plate are orthogonal to each other. The absorption axis 8a of the lower polarizing plate is arranged at an angle of 45° counterclockwise to the direction 12 of the central liquid crystal molecule indicating the alignment direction of liquid crystal at the intermediate portion between the first substrate 1 and the second substrate 4 of the nematic liquid crystal 7. The absorption axis 9a of the upper polarizing plate, on the other hand, is arranged at an angle of 45° clockwise to the direction 12 of alignment of the central liquid crystal molecule, thereby making up a liquid crystal shutter of positive type displaying white in the absence of a voltage applied thereto.

As long as no voltage is applied, the linear polarized light entering from the lower polarizing plate 8 is changed to an elliptical plarized light by the birefringence characteristic of the liquid crystal, and, assuming an open state, emitted as white light colored slightly yellowish as compared with the upper polarizing plate 9. Upon application thereto of 20 to 30 V, DC or AC, the liquid crystal molecules are erected in the direction perpendicular to the substrates, and lose both the birefringence characteristic and the optical rotatory power. Thus, the linear polarized light entering by way of the lower polarizing plate 8 proceeds directly through the liquid crystal element and is blocked by the upper polarizing plate 9, thereby changing to a closed state for black display.

The liquid crystal shutter of this type uses a liquid crystal element having a twist angle of 180° to 260°. The response time from closed to open state, therefore, is 1 to 2 ms and much shorter than that of the conventional TN liquid crystal shutter having a twist angle of 90° utilizing the optical rotatory power with the polarizing plates arranged parallel to the liquid crystal molecules, thus making possible a high-speed response. The response time from open to closed state, on the other hand, is not more than 1 ms upon application of a high voltage of 20 to 30 V. Further, the absence of the birefringence characteristic in closed state for black display produces a high contrast.

The technique disclosed in Japanese Unexamined Patent Publication No. 9-119219 described above, however, requires a drive voltage of not less than 20 V, and therefore uses a drive IC and a boosting circuit with a high breakdown voltage as a drive circuit.

DISCLOSURE OF THE INVENTION

The object of the present invention is to provide a liquid crystal shutter, which can be driven with a low voltage of not higher than 10 V by reducing the drive voltage thereof further, and in which the on/off switching of the shutter can be performed at high speed while at the same time producing a high contrast, on the one hand, and to reduce the cost and the power consumption by simplifying the drive circuit using the particular liquid crystal shutter, on the other hand.

In order to achieve the object described above, according to a first aspect of the present invention, there is provided a liquid crystal shutter comprising a liquid crystal element holding a nematic liquid crystal having a twist angle of 180° to 260° between a pair of substrates including a first substrate and a second substrate, a pair of polarizing plates arranged to hold the liquid crystal element described above therebetween, and an optical compensator arranged between the liquid crystal element and one of the polarizing plates, characterized in that the angle formed between the absorption axes of the pair of the polarizing plates is set in the range of 80° to 100°, the angle formed by the absorption axis of one of the polarizing plates and the direction of central liquid crystal molecule of the liquid crystal element is set in the range of 40° to 60°, and the delay axis of the optical compensator is arranged substantially in parallel to the direction of the central liquid crystal molecule of the liquid crystal element.

Also, this aspect of the invention is characterized in that the retardation value on the front of the optical compensator is set in the range of 0.01 to 0.1 m.

Further, this aspect of the invention is characterized in that the value Δnd which is the product of the birefringence index Δn of the nematic liquid crystal and the gap d between the first substrate and the second substrate is set in the range of 0.6 to 0.9 μm.

Also, this aspect of the invention is characterized in that the optical compensator is a retardation film and the lag axis of the optical compensator has the same direction as the lag axis of the retardation film.

Further, the optical compensator is a discotic film with a discotic structured compound aligned on a transparent film at a varying inclination angle along the thickness thereof, and the delay axis of the optical compensator is an optical axis orthogonal to the alignment direction of the discotic film.

An example of a liquid crystal shutter according to the second aspect of the present invention comprises a liquid crystal element with a nematic liquid crystal having a twist angle of 180° to 260° held between a pair of substrates including a first substrate and a second substrate, a pair of polarizing plates, a pair of polarizing plates arranged to hold the liquid crystal element, and a first optical compensator and a second optical compensator arranged between the liquid crystal element and one of the polarizing plates, characterized in that the angle formed between the absorption axes of the pair of the polarizing plates is set in the range of 80° to 100°, and the angle formed between the absorption axis of said one of the polarizing plates and the alignment direction of the central liquid crystal molecule of the liquid crystal element is set in the range of 40° to 60°.

Another example of the liquid crystal shutter according to the second aspect comprises a liquid crystal element with a nematic liquid crystal having a twist angle of 180° to 260° held between a pair of substrates including a first substrate and a second substrate, a pair of polarizing plates arranged with the liquid crystal element held therebetween, a first optical compensator arranged between the liquid crystal element and one of the polarizing plates, and a second optical compensator arranged between the liquid crystal element and the other polarizing plate, characterized in that the angles formed between the absorption axes of the pair of the polarizing plates is set in the range of 80° to 100°, and the angle formed between the absorption axis of said one of the polarizing plates and the alignment direction of the central liquid crystal molecule of the liquid crystal element is set in the range of 40° to 60°.

Also, this aspect of the invention is characterized in that the difference between the retardation value on the front of the first optical compensator and the retardation value on the front of the second optical compensator is set in the range of 0.01 to 0.1 μm.

Further, this aspect of the invention is characterized in that the value Δnd which is the product of the birefringence index Δn of the nematic liquid crystal and the gap d between the first substrate and the second substrate is set in the range of 0.6 to 0.9 μm.

Furthermore, this aspect of the invention is characterized in that the value d/P which is the quotient between the twist pitch P of the nematic liquid crystal of a liquid crystal element having a twist angle of θ and the gap d between the first substrate and the second substrate is set in the range of 0.5 to θ/360.

Also, this aspect of the invention is characterized in that the first optical compensator is a first retardation film, the second optical compensator is a second retardation film, the delay axis of the first retardation film is arranged substantially orthogonally orthogonal to the direction of the central liquid crystal molecule of the liquid crystal element, and the delay axis of the second retardation film is arranged substantially parallel to the direction of the central liquid crystal molecule of the liquid crystal element.

According to still further aspect of the invention, there is provided liquid crystal shutter, characterized in that the first optical compensator and the second optical compensator are each a discotic film with a discotic structured compound aligned on a transparent film at a varying inclination angle along the thickness thereof, and one of the pair of the polarizing plates makes up an upper polarizing plate, the other polarizing plate makes up a lower polarizing plate, the first optical compensator is a first discotic film, and the first discotic film is interposed between the lower polarizing plate and the liquid crystal element, characterized in that the direction orthogonal to the direction of the central liquid crystal molecule of the liquid crystal element makes up a horizontal axis, the angle formed between the alignment direction of the first discotic film and the horizontal axis is set in the range of 0° to 30°, the angle formed between the alignment direction of the first discotic film and the alignment direction of the lower liquid crystal molecule is not more than the angle formed between the alignment direction of the first discotic film and the alignment direction of the upper liquid crystal molecule;

the second optical compensator makes up the second discotic film, and the second discotic film is interposed between the upper polarizing plate and the liquid crystal element; and the angle formed between the alignment direction of the second discotic film and the horizontal axis is set in the range of 0° to 30°, and the angle formed between the alignment direction of the second discotic film and the alignment direction of the upper liquid crystal molecule is not more than the angle formed between the alignment direction of the second discotic film and the alignment direction of the lower liquid crystal molecule.

BRIEF DESCRIPTION OF THE DRAWINGS

FIG. 9 is a graph showing the relation between the value Δnd and the transmittance of the liquid crystal element according to the first embodiment of the present invention.

FIG. 10 shows a drive waveform and a transmittance vs. time curve for explaining the response time of a liquid crystal shutter according to the first embodiment of the present invention.

BEST MODE FOR CARRYING OUT THE INVENTION

Figure 1:
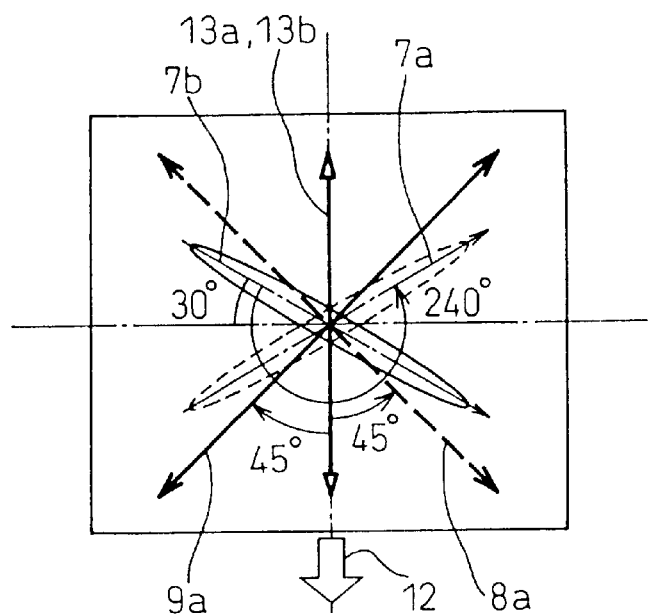
FIG. 1 is a plan view showing the positional relation between the alignment directions of the molecules, etc. of the liquid crystal shutter according to a first embodiment of the present invention.

The operation of a liquid crystal shutter according to the first aspect of the invention (the case in which one optical compensator is used and corresponding to claims 1 to 5 and the first and third embodiments) and the second aspect (the case in which two optical compensators are used and corresponding to claims 6 to 12 and the second and fourth embodiments) will be explained in detail below while at the same time explaining the problem points of the conventional structure, with reference to the drawings.

In the description that follows, the generic concept is defined as the optical compensator (13, 15, 16 in the drawings) and the more limitative concept of the optical compensator is defined as the retardation film and the discotic film. The optical compensator has a lag axis (13a, 15a, 16a) in the same direction as the lag axis (13b, 15b, 16b) of the retardation film and in the direction orthogonal to the direction (13c, 15c, 16c) of orientation of the discotic film.

First Aspect of the Invention

Figure 2:
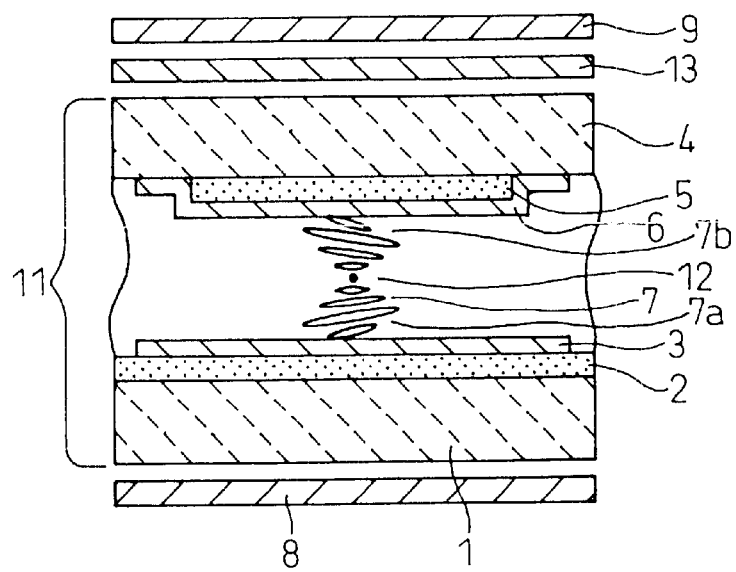
FIG. 2 is a sectional view showing a configuration of a liquid crystal shutter according to the first embodiment of the present invention.

FIG. 1 is a plan view showing an example of the relative positions of the polarizing plates, the optical compensator or the retardation film of a liquid crystal shutter according to this invention. Also, FIG. 2 is a diagram showing the structure of an example of a liquid crystal shutter according to this invention. As shown in FIG. 2, the liquid crystal shutter comprises a liquid crystal element 11, an optical compensator (or a retardation film) having a retardation value of 0.03 μm, an upper polarizing plate 9 and a lower polarizing plate 8. The absorption axes of the upper and lower polarizing plates 9, 8 are orthogonal to each other. As shown in FIG. 1, the absorption axis 8a of the lower polarizing plate is arranged at an angle of 45° counterclockwise to the direction 12 of the central liquid crystal molecule, and the delay axis 13a of the optical compensator (or the lag axis 13b of the retardation film) is arranged parallel to the direction 12 of the central liquid crystal molecule.

Incidentally, in the conventional liquid crystal display apparatus using a retardation film, the absorption axes of the polarizing plates are generally arranged to intersect with each other at an angle of 60° to 70° in order to secure the birefringence of the liquid crystal molecules. Japanese Unexamined Patent Publication No. 5-264957, for example, illustrates a configuration of a liquid crystal display apparatus using one retardation film and a liquid crystal display apparatus using two retardation films. The drawing of Japanese Unexamined Patent Publication No. 5-264957 configured to have two retardation films shows that the upper and lower polarizing plates are arranged in such a manner that the absorption axes thereof intersect with each other at an angle of 70°. Further, the extension axes (corresponding to the delay axes according to the present invention) of the two retardation films intersect with each other at an angle of 10°, and each of the two retardation films is arranged at an angle of 40° to 50° to the direction of the central liquid crystal molecule.

Figure 13:
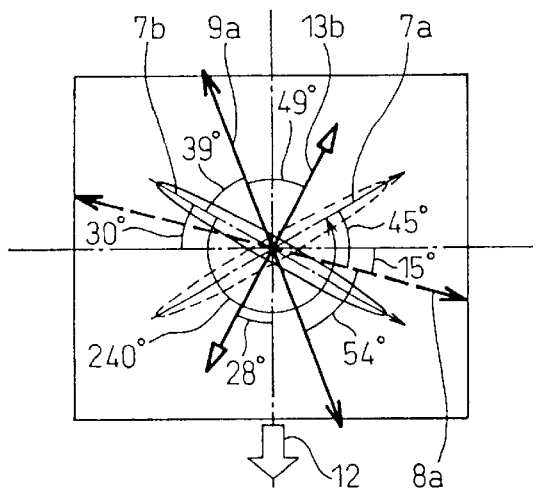
FIG. 13 is a plan view showing the positional relations of the alignment directions of molecules, etc. in the case where a retardation film used according to the prior art.

Also, the configuration of the liquid crystal display apparatus using one retardation film is illustrated in Japanese Unexamined Patent Publication No. 5-264957. In order to clarify the difference between FIG. 1 of the present invention and Japanese Unexamined Patent Publication No. 5-264957, the latter is shown in FIG. 13. Specifically, Japanese Unexamined Patent Publication No. 5-264957 is illustrated anew based on the direction 12 of the central liquid crystal molecule as in FIG. 1 of the present invention. The liquid crystal elements shown in FIGS. 1 and 13 are both a STN liquid crystal element having a twist angle of 240° and have an equal Δnd value of 0.78 μm.

In FIG. 13, the absorption axes (8a, 9a) of the upper and lower polarizing plates intersect with each other at an angle of 54°, and the absorption axis 9a of the upper polarizing plate intersects with the alignment direction 7b of the upper liquid crystal molecule at an angle of 39°, while the absorption axis 8a of the lower polarizing plate intersects with the alignment direction 7a of the lower liquid crystal molecule at an angle of 45°. Also, the retardation value of the lag axis 13b of the retardation film is a very large 0.6 μm, and the lag axis 13b of the retardation film is arranged at a position inclined about −28° clockwise from the direction 12 of the central liquid crystal molecule, the absorption axis 9a of the upper polarizing plate forming an angle of 49° with the delay axis 13b of the retardation film.

As described above, in the conventional liquid crystal display apparatus having a retardation film, the birefringence index assumes a maximum value when the delay axis of the polarizing plate is 45° with respect to the optical compensator and the liquid crystal molecules. In order to easily secure the birefringence, therefore, the absorption axes of the polarizing plates are arranged at a position displaced by 35° to 50° from the alignment directions (7a, 7b) of the upper and lower liquid crystal molecules and the delay axis 13b of the retardation film.

Figure 5:
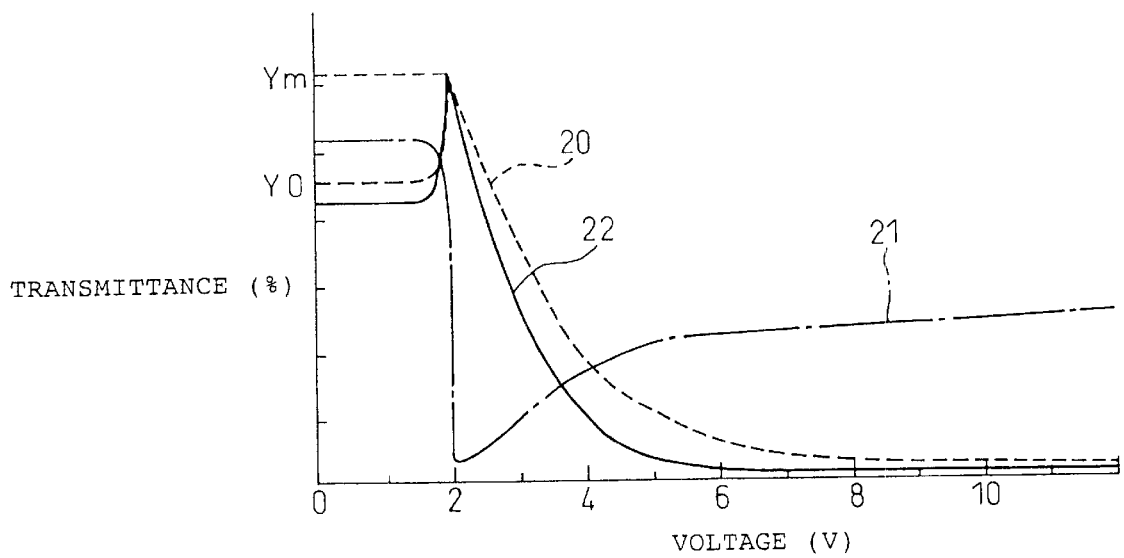
FIG. 5 is a graph showing for comparing the transmittance vs. applied voltage curves between the present invention and the prior art.
Figure 11:
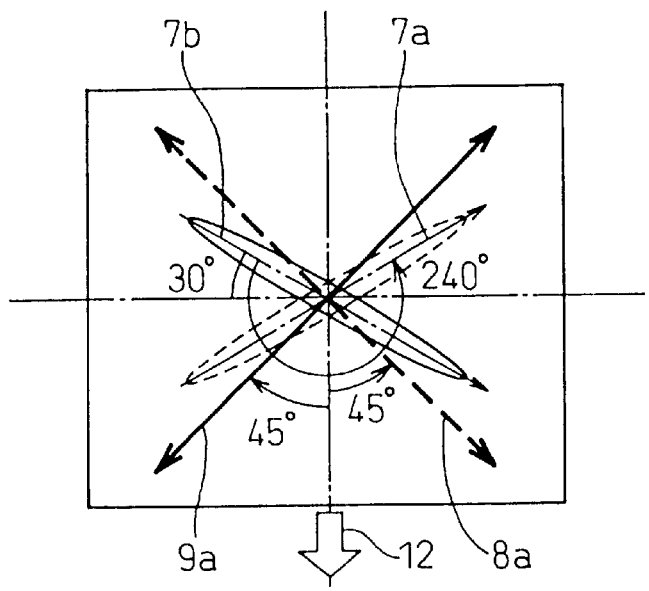
FIG. 11 is a plan view showing the positional relations of the directions of orientation of molecules, etc. of a conventional liquid crystal shutter.
Figure 12:
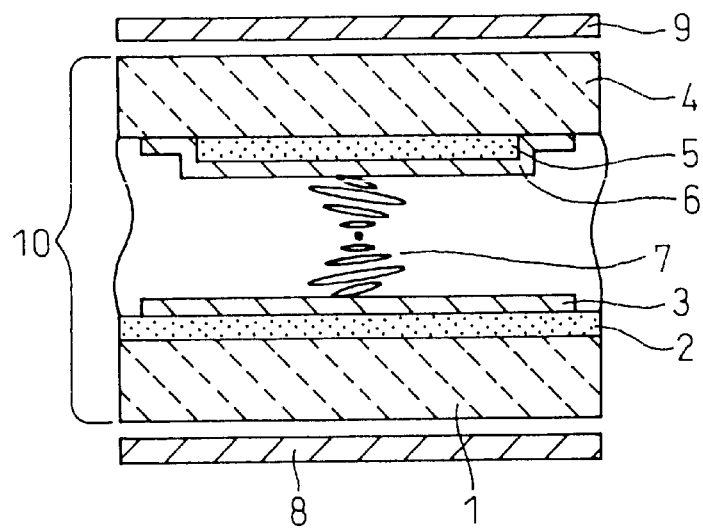
FIG. 12 is a sectional view showing a configuration of a conventional liquid crystal shutter.

FIG. 5 is a graph for comparing the voltage vs. transmittance curve representing the change in transmittance with respect to the applied voltage of the liquid crystal shutter between the present invention and the prior art (the curves 20, 21 represent the prior art, and the curve 22 the present invention). The dotted curve 20 in the drawing is a voltage vs. transmittance curve of the liquid crystal shutter disclosed in Japanese Unexamined Patent Publication No. 9-119219 using the birefringence for white and the cancellation of the optical rotatory power for black, i.e. a liquid crystal shutter having the relative positions shown in FIG. 11 described above. The solid curve 22, on the other hand, shows a voltage vs. transmittance curve of the liquid crystal shutter having the relative positions of FIG. 1 according to the present invention. For comparison, the voltage vs. transmittance curve of the conventional STN liquid crystal display apparatus having the relative positions shown in FIG. 13 is indicated by the one-dot chain 21.

As shown, the liquid crystal shutter disclosed in Japanese Unexamined Patent Publication No. 9-119219 indicated by the curve 20 is such that the transmittance increases temporarily at a voltage of about 2 V and reaching a maximum transmittance Ym, decreases gradually subsequently. The liquid crystal shutter according to the present invention shown by the curve 22, on the other hand, is such that superior black is obtained at a voltage of not less than 6 V, a contrast of not less than 100 is obtained at 10 V, and thus a perfect black can be obtained at a lower voltage than in the liquid crystal shutter disclosed in Japanese Unexamined Patent. Publication No. 9-119219.

In the state in which 10 V is applied to the liquid crystal elements, shown by the curves 20 and 22, almost all the liquid crystal molecules stand perpendicular to the substrates, while the liquid crystal molecules in the boundary between the upper and lower substrates are parallel to the substrates and considered to be located in the alignment direction along which the upper and lower substrates are rubbed. Thus, when 10 V is applied, birefringence of the liquid crystal element is not completely eliminated.

In view of this, in the liquid crystal shutter according to the present invention, an optical compensator or a retardation film having a very small retardation film of 0.03 μm is arranged in such a direction as to subtract the slight remaining birefringence characteristic. In this way, the birefringence characteristic can be successfully removed even with a drive voltage as low as 10 V, thereby realizing a still higher contrast.

The response time from the open to the closed state depends on the applied voltage, and is shorter the higher the applied voltage. An applied voltage of not less than 10 V can shorten the response time to not more than 1 ms. The response time for the transfer from the closed to the open state, which utilizes the elastic effect, on the other hand, depends on the liquid crystal material and the twist angle and, in the case of a material low in viscosity, is shorter the larger the twist angle. With the liquid crystal shutter according to this invention using a twist angle of 180° to 260°, a response time of about 1 ms is possible.

On the other hand, the maximum transmittance on the curve 21 of the conventional liquid crystal display apparatus is lower than the maximum transmittance Ym of the present invention and undergoes a sharp change for black display at about 2 V, but a perfect black cannot be obtained. As compared with the present invention, therefore, the contrast value is low. A further increase in voltage increases the black level gradually, and therefore the response time from open to closed state cannot be shortened by applying a high voltage.

Specifically, in the conventional liquid crystal display apparatus using the retardation film, the birefringence is utilized for both white display and black display and is adjusted to obtain black and white with small coloring. As a result, it can be driven with 2 to 3 V. Nevertheless, the retardation value of 0.5 to 0.6 μm is required for the retardation film, and the response speed is as low as several tens of ms. Further, the contrast is as low as not more than 10. Therefore, the conventional liquid crystal display apparatus is not suitably used as a liquid crystal shutter.

Another example of the liquid crystal display apparatus using the retardation film having a retardation value of 0.1 to 0.15 μm is disclosed in Japanese Unexamined Patent Publication No. 6-3665. The basic operation is similar to that of the present invention, except that an attempt is made to improve the contrast by compensating for the birefringence remaining in the liquid crystal element with the retardation film while the voltage is being applied.

Also with this liquid crystal display apparatus, in order to drive it with an applied voltage of 2 to 3 V, the retardation value of the retardation film is set to 0.1 to 0.15 μm which is larger than the retardation value of the retardation film or the optical compensator according to the present invention. Also, the angle formed between the absorption axis of the lower polarizing plate to the direction of the central liquid crystal molecule is set to −15°, which is greatly different from the figure of 40° to 60° with which the present invention is configured. Therefore, this conventional liquid crystal display apparatus cannot be expected to exhibit an effect equivalent to the contrast and response speed according to the present invention.

In order to obviate the various problem points of the prior art described above, the liquid crystal shutter according to the present invention uses a liquid crystal, element having a twist angle of 180° to 260°, and utilizes the birefringence in the open state for white display, while a retardation film having a very small retardation value is arranged in the direction of the central liquid crystal molecule in the closed state for black display. In this way, the slight amount of birefringence remaining, with the liquid crystal molecules standing perpendicular to the substrates is corrected to completely eliminate the birefringence. Further, the angle at which the polarizing plates are arranged or the retardation value of the optical compensator or the retardation film are optimized as a liquid crystal shutter, thereby making it possible to provide a liquid crystal shutter having a high contrast and a high-speed response with a drive voltage as low as about 10 V.

Second Aspect of the Invention

Figure 15:
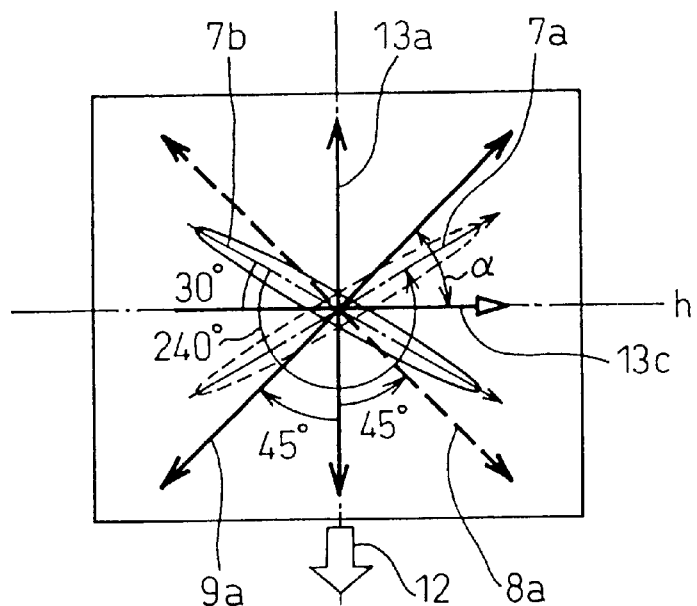
FIG. 15 is a plan view showing the positional relations of the alignment directions of molecules, etc. of a liquid crystal shutter according to a third embodiment of the present invention.

Now, the operation of the liquid crystal shutter according to the second aspect of the present invention will be explained in detail with reference to the drawings. FIG. 15 is a plan view showing the relative positions of polarizing plates and optical compensators of a liquid crystal shutter according to the present invention. In this diagram, the liquid crystal shutter according to this embodiment has a structure shown in FIG. 4 (an example of the second aspect) and FIG. 17 (another example of the second aspect), and is configured with a liquid crystal element 14, optical compensators 15, 16 having a front retardation value of 0.03 μm, an upper polarizing plate 9 and a lower polarizing plate 8, in which the absorption axes of the upper and lower polarizing plates orthogonally intersect with each other. As shown in FIG. 15, the absorption axis 8a of the lower polarizing plate is arranged at 45° counterclockwise with respect to the direction 12 of the central liquid crystal molecule, and the discotic film is oriented in the direction 13c in such a manner as to intersect orthogonally with the direction 12 of the central liquid crystal molecule.

Figure 20:
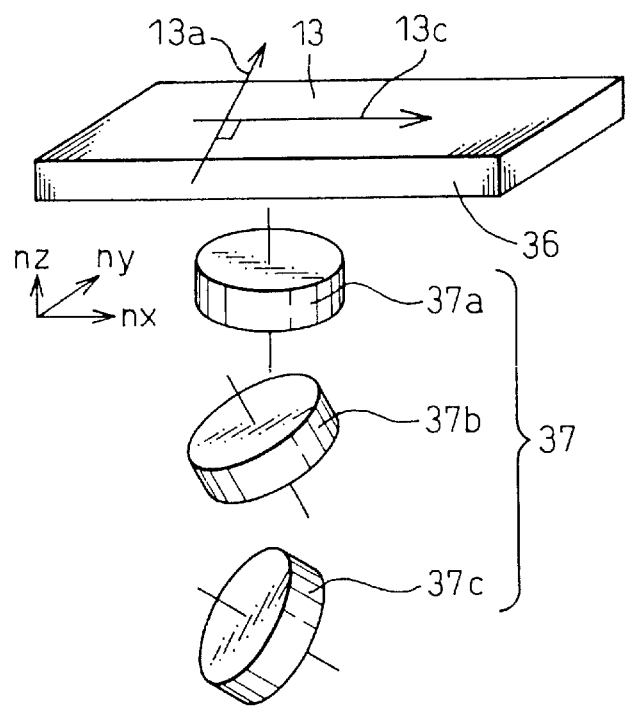
FIG. 20 is a schematic diagram for explaining the structure of a discotic film.

FIG. 20 is a schematic diagram for explaining the configuration of the discotic film 13 making up an optical compensator. The discotic film 13 is produced by coating an alignment layer on a transparent film 36 of triacetyl cellulose (TAC) or the like, rubbing along the alignment direction 13c (See FIG. 15) and then coating a discotic structured compounds 37 (37a, 37b, 37c) such as a discotic liquid crystal, followed by orientation and fixing. The discotic structured compound 37a on the boundary with the transparent film 36 is aligned substantially in parallel to the transparent film 36, but the other discotic structured compounds have a progressively changing inclination angle along the thickness. Thus, the discotic structured compound 37c farthest from the transparent film 36 is inclined by 50° to 70° with respect to the alignment direction 13c.

Specifically, the discotic structured compound 37a in the neighborhood of the boundary with the transparent film 36, of which the refractive index nx along X axis and the refractive index ny along Y axis are equal to each other for the light incident from the front of the transparent film, has substantially no retardation value. The discotic structured compound 37c farthest from the transparent film 36 which is inclined by 50° to 70°, on the other hand, develops a retardation due to the anisotropy between the refractive index nz in the direction along the thickness and the refractive index ny along the Y axis.

Specifically, the refractive index in the direction orthogonal to the direction 13c of orientation is larger than the refractive index in other directions, which direction corresponds to the delay axis 13a of the optical compensator. The retardation value depends on the inclined state of the discotic structured compound 37. Normally, however, the front retardation value is in the range of 0.03 to 0.05 μm. Further, when the normal optical compensator is inclined in the direction of the extension axis thereof, the retardation value changes in all directions. The optical compensator under consideration, however, has the retardation value increased for the light entering from the direction inclined along the arrow indicating the alignment direction 13c, while the retardation value is decreased for the light entering from the direction inclined opposite to the arrow indicating the alignment direction 13c.

Figure 21:
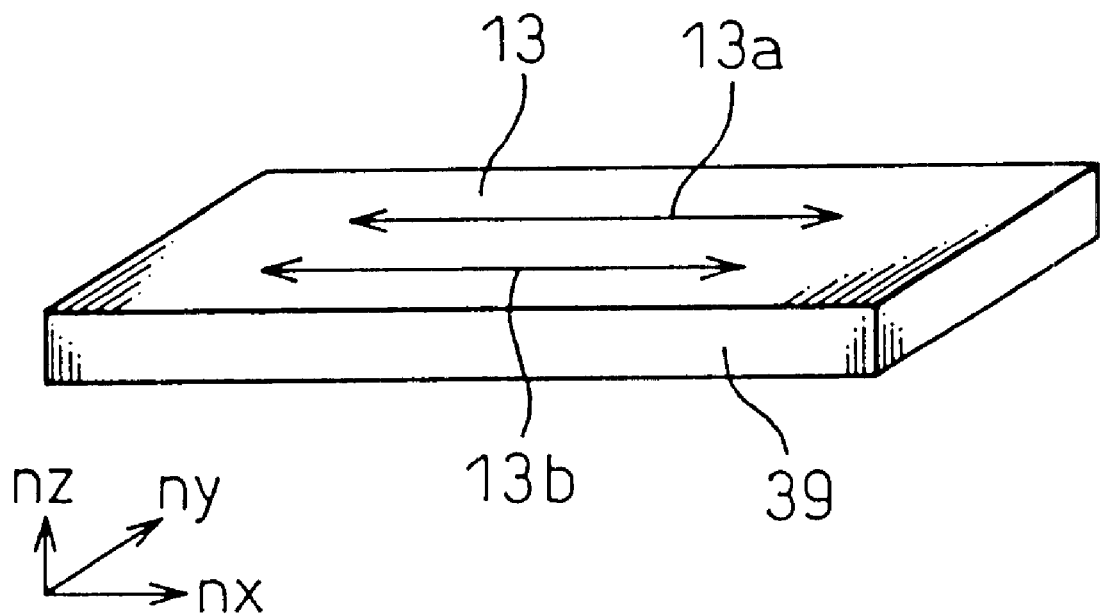
FIG. 21 is a schematic diagram for explaining the configuration of a retardation film used as an optical compensator.

FIG. 21 is a schematic diagram for explaining the configuration of the retardation film used as an optical compensator. The retardation film 39 is an extension film composed of a transparent film 38 of polycarbonate (PC), polyvinyl alcohol (PVA) or polymethyl methacrylate (PMMA) extended along X axis and Y axis. In the case of PC or PVA, extension along X axis aligns the polymer molecules in the direction of extension, i.e. along X axis so that the refractive index nx increases beyond the refractive index ny, and the direction nx constitutes the delay axis. In the case of PMMA, on the other hand, extension along X axis increases the refractive index ny as compared with the refractive index nx, so that the direction ny constitutes the delay axis.

The retardation value of these retardation films on the front is expressed by the equation $$(nx-ny) \times d$$

where d is the thickness of the retardation film. Generally, a retardation film as thick as 50 to 100 μm is used.

Now, an explanation will be given of a conventional liquid crystal display apparatus having an optical compensator using a discotic film. The optical compensator using a discotic film finds wide applications for improving the angle of field characteristic of the liquid crystal display apparatus in TN mode. As an example, the liquid crystal display apparatus disclosed in Japanese Unexamined Patent Publication No. 8-50206 will be explained with reference to FIGS. 18 and 19.

Figure 18:
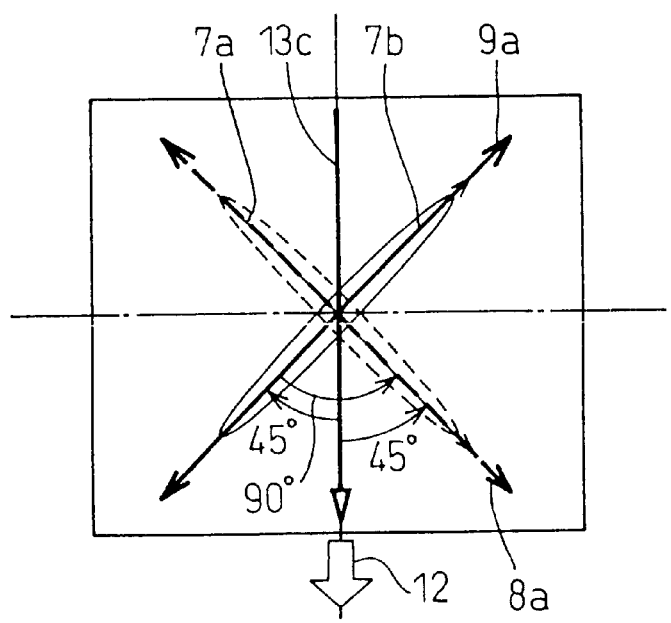
FIG. 18 is a plan view showing the positional relations of the alignment directions of molecules, etc. in the case where one retardation film is used according to the prior art.

FIG. 18 is a plan view for explaining the relative positions in the conventional liquid crystal display apparatus using a single discotic film. This liquid crystal display apparatus is configured with, from top to bottom, an upper polarizing plate, a discotic film, a liquid crystal element having a twist angle of 90° and a lower polarizing plate. In FIG. 18, the arrows in the alignment direction 7b of the upper liquid crystal molecule and the alignment direction 7a of the lower liquid crystal molecule indicate the directions of rubbing. The liquid crystals on the arrow sides are inclined outward of the substrates.

Thus, this liquid crystal element assumes a structure having a twist angle of 90° with the direction 12 of the central liquid crystal molecule as a priority angle of field (main direction of visual angle) of the liquid crystal display apparatus. The absorption axis 9a of the upper polarizing plate is arranged parallel to the alignment direction 7b of the upper liquid crystal molecule, while the absorption axis 8a of the lower polarizing plate is arranged parallel to the alignment direction 7a of the lower liquid crystal molecule thereby to minimize the occurrence of birefringence.

On the other hand, the discotic film also has an inclination, and therefore the arrow is shown only on one side. As shown in FIG. 20, the portion of the discotic structured compound 37 on the side thereof opposite to the arrow is inclined outward of the transparent film 36. In the conventional liquid crystal display apparatus, in order to improve the angle of field characteristic, the alignment direction 13c of the discotic film 13 is arranged parallel to the alignment direction 12 of the central liquid crystal molecule, as shown in FIG. 18.

In the liquid crystal shutter according to this invention, however, as shown in FIG. 15, in order to completely eliminate the birefringence of the liquid crystal element with a voltage applied thereto, the discotic film constituting an optical compensator is arranged with the alignment direction 13c thereof orthogonal to the direction 12 of the central liquid crystal molecule. Thus, the operation of the present invention and that of the prior art are quite different.

Figure 19:
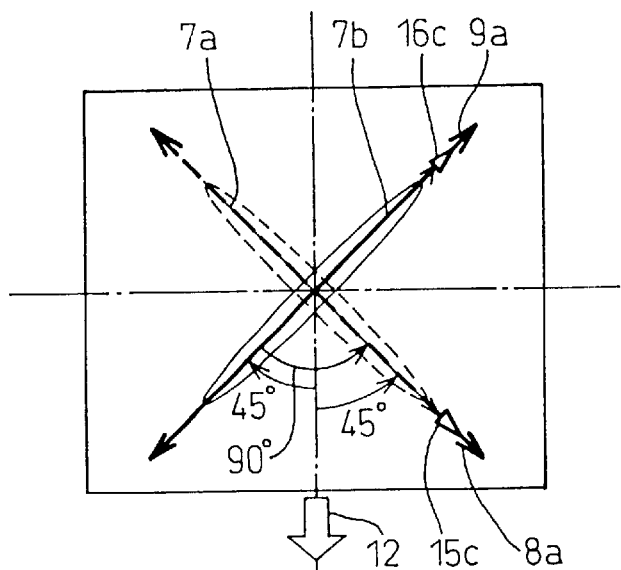
FIG. 19 is a plan view showing the positional relations of the alignment directions of molecules, etc. in the case where two retardation films are used according to the prior art.

FIG. 19 is a plan view for explaining the relative positions in the conventional liquid crystal display apparatus using two discotic films. This liquid crystal display apparatus is configured with, from top to bottom, an upper polarizing plate, a second discotic film, a liquid crystal element having a twist angle of 90°, a first discotic film and a lower polarizing plate. The absorption axis 9a of the upper polarizing plate is arranged parallel to the alignment direction 7b of the upper liquid crystal molecule, while the absorption axis 8a of the lower polarizing plate is arranged parallel to the alignment direction 7a of the lower liquid crystal molecule. The alignment direction 16c of the retardation film is arranged parallel to the alignment direction 7b of the upper liquid crystal molecule, while the alignment, direction 15c of the retardation film is arranged parallel to the alignment direction 7a of the lower liquid crystal molecule.

The absorption axis 9a of the upper polarizing plate intersects with the alignment direction 16c of the second discotic film at an angle of 0°, and therefore no retardation is generated by the second discotic film for the light entering from the front. In similar fashion, the absorption axis 8a of the lower polarizing plate intersects with the alignment direction 15c of the first discotic film also at an angle of 0°, and therefore no retardation is generated. According to the present invention, on the other hand, the birefringence of the liquid crystal molecules is corrected by generating a retardation, and therefore the operation is different from that of the discotic film according to the prior art. Also, the effect of improving the angle of field characteristic of the discotic film according to the prior art is significant for the TN liquid crystal element, and an embodiment for the liquid crystal element having a twist angle of 180° to 260° is not disclosed.

With the liquid crystal shutter according to this invention, therefore, as will be explained with reference to the third embodiment later, the liquid crystal element having a twist angle of 180° to 260° is used and the birefringence is utilized in open state for white display. In the closed state for black display, on the other hand, the discotic film using a discotic structured compound is arranged orthogonal to the direction of the central liquid crystal molecule, so that the slight remaining birefringence is corrected with the liquid crystal molecules erected perpendicular to the substrates thereby to completely eliminate the birefringence. Further, the angle at which the polarizing plates are arranged and the retardation value of the optical compensator are optimized for the liquid crystal shutter, thereby making it possible to provide a liquid crystal shutter which has a high contrast and a high response speed even when driven with a voltage as low as about 10 V.

Preferred Embodiments of the Invention

Preferred embodiments for implementing the first and second aspects of the present invention and the effects thereof will be explained in detail below with reference to the drawings.

Embodiment 1

First, the configuration of a liquid crystal shutter according to the first embodiment of the invention will be explained with reference to the drawings. FIG. 2 is a sectional view showing the structure of a liquid crystal shutter according to the first embodiment of the invention, and FIG. 1 a plan view as taken from above in FIG. 2. The configuration of the liquid crystal shutter according to this invention will be explained below with reference to FIGS. 1 and 2. This embodiment refers to the case where a single retardation film is used as an optical compensator.

The liquid crystal shutter according to the first embodiment is configured with a lower polarizing plate 8 arranged under the liquid crystal element 11 having a twist angle of 240°, a retardation film 13 constituting an optical compensator arranged above the liquid crystal element 11, and an upper polarizing plate 9. The liquid crystal element 11 is formed of a first substrate 1 of glass 0.7 mm thick formed with a first electrode 2 of ITO making up a transparent electrode and an alignment layer 3 formed thereon, a second substrate 4 of glass 0.7 mm thick with a second electrode 5 of ITO and an alignment layer 6 formed thereon, and a nematic liquid crystal 7. The birefringence index $\Delta n$ of the nematic liquid crystal used is 0.195, and the gap between the first substrate 1 and the second substrate 4 is 4 µm. The value $\Delta nd$ indicating the birefringence characteristic of the liquid crystal element is set to 0.78 µm.

The alignment layer 3 of the first substrate 1 is rubbed along the alignment direction 7a of the lower liquid crystal molecule shown in FIG. 1, and the alignment layer 6 of the second substrate 4 is rubbed along the alignment direction 7b of the upper liquid crystal molecule. Also, the nematic liquid crystal having a viscosity of 18 cp has added thereto a material having an optical rotatory power called a chiral material, with the twist pitch P thereof adjusted to 8 µm so that the relation d/P=0.5 is secured, thereby forming a liquid crystal element having a counterclockwise twist angle of 240°.

In order that the absorption axis 8a of the lower polarizing plate and the absorption axis 9a of the upper polarizing plate may intersect with each other orthogonally, the lower polarizing plate 8 and the upper polarizing plate 9 are arranged on the two sides, respectively, of the liquid crystal element 11. The absorption axis 8a of the lower polarizing plate is arranged at an angle of 45° counterclockwise with respect to the alignment direction 12 of the central liquid crystal molecule indicating the alignment direction of the liquid crystal at the intermediate portion between the first substrate 1 and the second substrate 4 of the nematic liquid crystal 7, while the absorption axis 9a of the upper polarizing plate is arranged at an angle of 45° clockwise with respect to the direction 12 of the central liquid crystal molecule, thus constituting a liquid crystal shutter of positive type assuming an open state when no voltage is applied thereto.

The retardation film 13 making up an optical compensator has the delay axis 13a (or 13b in the case of the retardation film) thereof arranged parallel to the alignment direction 12 of the central liquid crystal molecule and has a retardation value of 0.03 µm. The retardation film 13 is bonded integrally with the upper polarizing plate 9 by use of an acrylic adhesive. With an ordinary uniaxial extension method, a retardation film having such a very small retardation value as described above is difficult to produce. According to the first embodiment, a biaxial extension film with a polycarbonate film extended in two directions along X and Y axes is used, and one of the two axial directions having a larger retardation value is defined as an extension axis.

Now, the effects of the liquid crystal shutter according to the first embodiment will be explained. The change in transmittance upon application of an AC voltage of 300 Hz in frequency to the liquid crystal shutter of this configuration is indicated by a solid curve 22 shown in FIG. 5 as described above.

As long as no voltage is applied, on the other hand, the linear polarized light that has entered by way of the lower polarizing plate 8 is changed to an elliptical polarized light by the birefringence characteristic of the liquid crystal, thereby leading to an open state in which the light is emitted from the upper polarizing plate 9 as a slightly yellowish white display in what is called a positive display. When a DC or AC voltage is applied, the liquid crystal molecules stand perpendicular to the substrate, the birefringence is eliminated, and the linear polarized light that has entered by way of the lower polarizing plate 8 proceeds directly through the liquid crystal element and is blocked by the upper polarizing plate. Thus a closed state for a black display is assumed.

As shown by the curve 22 in FIG. 5, in the liquid crystal shutter according to the first embodiment, the transmittance gradually increases from the initial transmittance Y0 with no voltage applied, and after reaching the maximum transmittance Ym at the applied voltage of about 2 V, falls. Substantially, black is achieved at the applied voltage of 6 V, and the transmittance at the applied voltage of 10 V decreases to below 1/100 of the initial transmittance Y0, thus attaining the contrast of not less than 100.

Specifically, with a voltage of 10 V applied to the liquid crystal element 11, almost all the liquid crystal molecules stand perpendicular to the substrates while the liquid crystal molecules on the boundary of the substrates are parallel to the substrates and retain the birefringence characteristic slightly. Then, the molecules on the boundary surface of the substrates are oriented along the alignment direction 7a of the upper liquid crystal molecule and the alignment direction 7b of the lower liquid crystal molecule in FIG. 1. On the average, they assume a direction orthogonal to the alignment direction 12 of the central liquid crystal molecule and are aligned in the direction parallel to the horizontal axis in FIG. 1.

By arranging the retardation film 13 at a position 90° displaced from the horizontal axis providing the average alignment direction of liquid crystal, therefore, the remaining birefringence characteristic can be eliminated. Specifically, the contrast at a low drive voltage can be improved by locating the delay axis of the retardation film 13 at a position parallel to the direction 12 of the central liquid crystal molecule.

Figure 6:
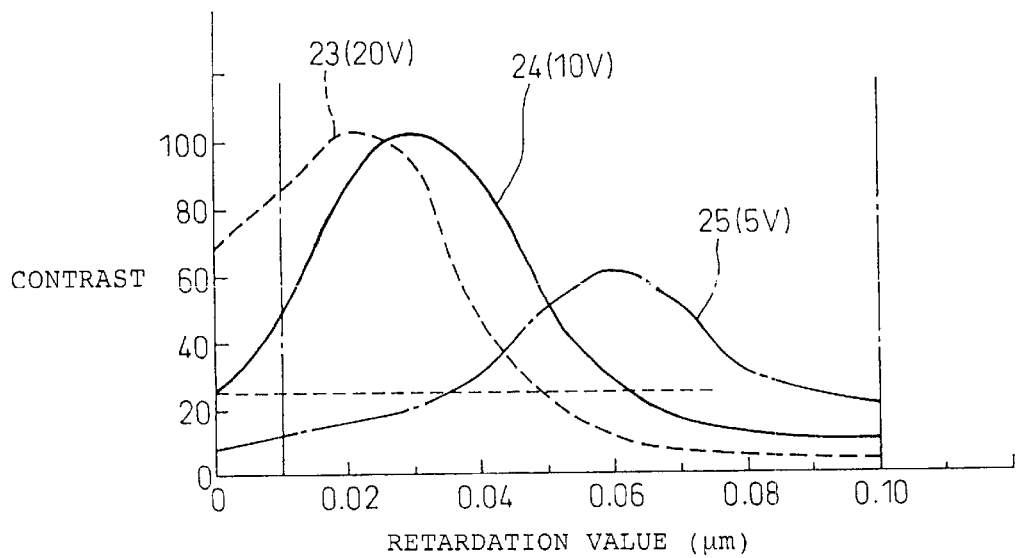
FIG. 6 is a graph showing the relation between the retardation value of the retardation film and the contrast according to the first embodiment of the present invention.

Now, the retardation value of the retardation film 13 will be explained. FIG. 6 is a graph showing the relation between the retardation value of the retardation film 13 and the contrast with a constant voltage applied to the liquid crystal shutter according to the first embodiment. A dotted curve 23 represents the case in which the applied voltage is 20 V, a solid curve 24 the case in which the applied voltage is 10 V, and a one-dot chain curve 25 the case in which the applied voltage is 5 V.

In the case where the applied voltage is 20 V, as indicated by the curve 23, a contrast of 50 or more is obtained even with the retardation value of zero. The contrast of not less than 100 can be obtained, however, by providing a retardation film having a retardation value of 0.03 µm. With a further increase in retardation value, however, the retardation of the retardation film increases beyond the remaining birefringence so that the contrast rather decreases.

In the case where the applied voltage is 10 V, on the other hand, as indicated by the curve 24, the contrast is not more than 30 for the retardation value of zero. By using a retardation film having a retardation value of about 0.03 µm, however, a contrast of not less than 100 can be obtained.

Also, the retardation value of the retardation film 13 is in the range of 0.01 to 0.06 μm, which improves the contrast more than when the retardation film is lacking.

With a further decrease of the applied voltage to 5 V, as indicated by the curve 25, the contrast is improved more than when the optical compensator is lacking even with the retardation value of 0.1 μm. In this way, the retardation value of the retardation film is applicable within the range of 0.01 to 0.1 μm although the optimum range thereof varies with the drive voltage.

Figure 7:
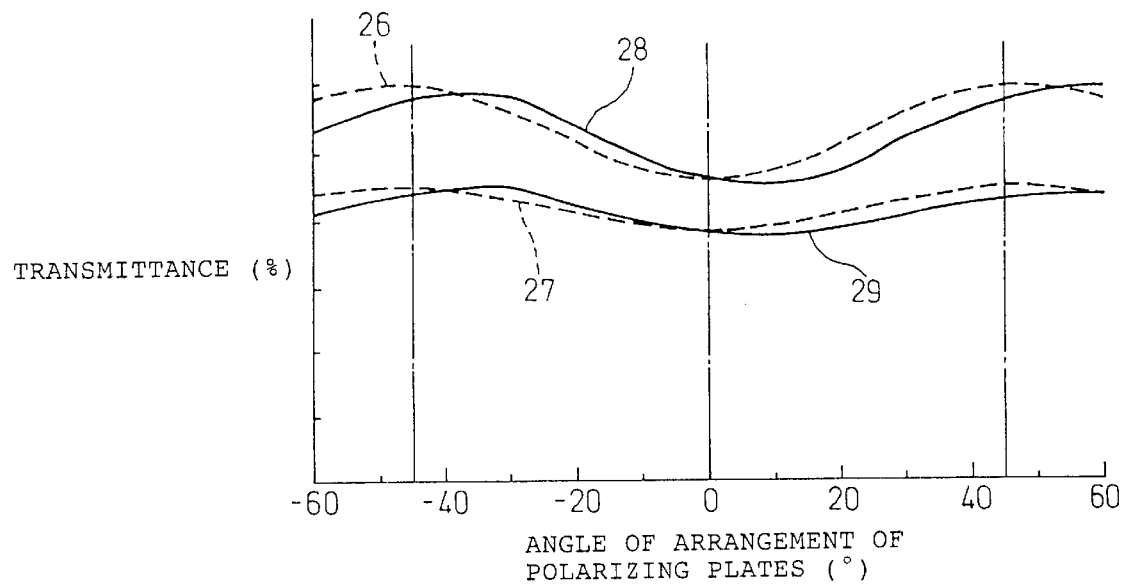
FIG. 7 is a graph showing the relation between the angles at which the polarizing plates are arranged and the transmittance according to the first and second embodiments of the present invention.

Now, the relative positions of the polarizing plates will be explained. FIG. 7 shows the transmittance of a liquid crystal shutter and the angle at which the lower polarizing plate is arranged in the case where the lower polarizing plate 8 is rotated counterclockwise from the direction of the central liquid crystal molecule with the angle of intersection between the absorption axis 8a of the lower polarizing plate 8a and the absorption axis 9a of the upper polarizing plate fixed at 90°, the liquid crystal shutter comprising a liquid crystal element having a twist angle of 240°, an Δnd value of 0.78 μm and a retardation film having a retardation value of 0.03 μm.

The solid curve 28 represents the relation between the maximum transmittance Ym of the liquid crystal shutter according to this invention and the angle at which the polarizing plates are arranged, and the solid curve 29 represents the relation between the angle at which the polarizing plates are arranged and the initial transmittance Y0 with no voltage applied. For comparison, the dotted curve 26 represents the value Ym of the liquid crystal shutter having no retardation film disclosed in Japanese Unexamined Patent Publication No. 9-119219, and the dotted curve 27 represents the value Y0 of a liquid crystal shutter having no retardation film.

With the polarizing plates arranged at an angle of −60°, the alignment direction 7a of the lower liquid crystal molecule and the absorption axis 8a of the lower polarizing plate are parallel to each other. With the liquid crystal shutter having no retardation film, on the other hand, as indicated by the curves 26 and 27, the initial transmittance Y0 and the maximum transmittance Ym both assume a local maximum value with a small coloring most desirably when the angle at which the lower polarizing plate is arranged is −45° and +45°.

With the liquid crystal shutter according to this invention comprising a retardation film having a retardation value of 0.03 μm, in contrast, the angle at which the lower polarizing plate is arranged which can secure the maximum transmittance is somewhat shifted and desirably in the range of −30° to −50° or 40° to 60°. Since the upper polarizing plate is orthogonal, the absorption axis 9a of the upper polarizing plate is also desirably at an angle in the range of 40° to 60° or −30° to −50°.

Figure 8:
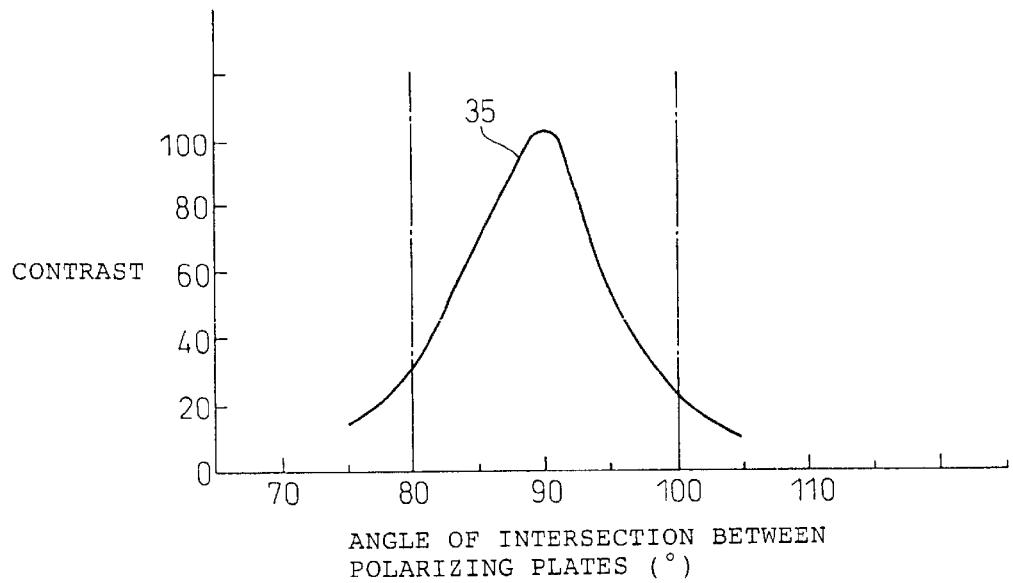
FIG. 8 is a graph showing the relation between the angle at which the polarizing plates intersect with each other and the contrast according to the first embodiment of the present invention.

FIG. 8 is a graph showing the relation between the angle at which the absorption axes of the upper and lower polarizing plates intersect with each other and the contrast. The upper and lower polarizing plates are relocated equally from the position shown in FIG. 1. As indicated by the curve 35, the highest contrast is obtained in the case where the absorption axes of the upper and lower polarizing plates intersect with each other at an angle of 90°.

In the case where the liquid crystal shutter according to this invention is used with a field sequential color display apparatus having a light source of a plurality of colors, the color with no voltage application is also important and, for adjusting the color, it is effective to reduce to about 85° the angle at which the absorption axes of the upper and lower polarizing plates intersect with each other. As indicated by the curve 35, however, in the case where the angle of intersection is reduced to 80° or less or increased to 100° or more, a perfect black cannot be obtained due to a reduced contrast. Therefore, the angle at which the polarizing plates intersect with each other is applicable in the range of 80° to −100°, or preferably in the range of 85° to 95°.

Now, the value Δnd of the liquid crystal element 11 will be explained. FIG. 9 shows the transmittance of the liquid crystal shutter and the value Δnd of the liquid crystal element 11 having a twist angle of 240°, with the absorption axis 8a of the lower polarizing plate turned 45° counterclockwise from the direction 12 of the central liquid crystal molecule, and with the absorption axis 8a of the lower polarizing plate and the absorption axis 9a of the upper polarizing plate intersecting with each other at 90°. In the diagram, the solid curve 32 represents the maximum transmittance Ym of the liquid crystal shutter according to the invention comprising the retardation film 13 having a retardation value of 0.03 μm, and the solid curve 33 represents the initial transmittance Y0 with no voltage applied. For comparison, the maximum transmittance Ym of the liquid crystal shutter having no retardation film and the initial transmittance Y0 of the liquid crystal shutter having no retardation film disclosed in Japanese Unexamined Patent Publication No. 9-119219 are shown by the curves 30 and 31, respectively.

With the liquid crystal shutter having no retardation film, as indicated by the curve 30, the maximum transmittance Ym assumes a maximum value at Δnd=0.65 μm and remains substantially unchanged with a further increase in Δnd. The initial transmittance Y0 with no voltage applied, on the other hand, gradually decreases, as shown by the curve 31. An excessively large Δnd, therefore, is not desirable. With the decrease of Δnd to less than 0.65 μm, on the other hand, the maximum transmittance Ym also undesirably decreases.

With the liquid crystal shutter according this invention comprising a retardation film 13 having a retardation value of 0.03 μm, the value Δnd associated with the maximum transmittance is somewhat shifted so that the maximum transmittance Ym is reached at Δnd=0.67 μm. The initial transmittance Y0 also assumes a maximum value at Δnd= 0.67 μm, and gradually decreases with a further increase in Δnd, as indicated by the curve 33.

In the case where the delay axis 13a of the compensator 13 (the delay axis 13b of the retardation film) is arranged parallel to the direction 12 of the central liquid crystal molecule, the retardation is added with no voltage applied, so that the white becomes somewhat yellowish. The white color can be improved, therefore, by reducing the value Δnd of the liquid crystal element 11 to a value about 0.02 to 0.05 μm smaller than the value Δnd of the liquid crystal element 10 of the liquid crystal shutter having no retardation film.

The value Δnd for the liquid crystal element 11 according to this invention is preferably set in the range of 0.6 μm to 0.9 μm, or more preferably in the range of 0.65 μm to 0.8 μm. The optimum Δnd value, though somewhat dependent on the twist angle of the liquid crystal element 11 or the retardation value of the retardation film 13, is substantially in the range of 0.6 to 0.9 μm for the twist angle of 180° to 260°.

According to the first embodiment, the value Δnd is set to 0.78 μm for the twist angle 240° of the liquid crystal element 11, and the retardation value of the retardation film 13 is set to 0.03 μm. In this way, a bright open state for white display with a comparatively small coloring and a contrast of not less than 100 are obtained when a drive voltage of 10 V is applied.

Now, the response time of the liquid crystal shutter according to this invention will be explained. FIG. 10 shows a drive waveform 42 with an AC signal of 100 Hz, 10 V applied for 50 ms to the liquid crystal shutter according to the present invention, and a transmittance vs. time curve (41) indicating the change in transmittance with time. Upon application of an AC signal in the open state without any voltage applied, the transmittance increases for a moment, followed by blackening into closed state. The on response time 43 from the open to the closed state is affected by the applied voltage, and becomes shorter the higher the voltage applied to the liquid crystal shutter. The liquid crystal shutter according to the first embodiment is impressed with a voltage of 10 V, and therefore the on response time is very short and less than 1 ms.

When the AC signal is returned to 0 V from the closed state, on the other hand, the maximum transmittance is reached within about 1.5 ms, after which the initial transmittance is restored within about 20 ms. The off response time from the closed to the open state which uses the elasticity for restoring the twist of the liquid crystal is shorter for the liquid crystal element having a larger twist angle. The response time for the liquid crystal element is originally defined as the time required before the change in the liquid crystal molecules is settled and is 20 ms in FIG. 10. In an application as a liquid crystal shutter, however, the time required before restoring the maximum transmittance is effective as a response time, and therefore the off response time 44 of the liquid crystal shutter according to this invention having a twist angle of 240° is 1.5 ms. Thus, a liquid crystal shutter of high response speed is obtained.

Before the maximum transmittance is reached in the open state from black in closed state, a somewhat bluish white is displayed with a comparatively small coloring. After the lapse of about 10 ms which is a holding time (designated by 45) during which the maximum transmittance is maintained, the transmittance is reduced with a somewhat yellowish coloring. As a result, for a gradated display, a reset signal is applied to restore the closed state within the holding time 45 when the liquid crystal shutter maintains the maximum transmittance, and the state with a small coloring between the closed state and the maximum transmittance is utilized, thereby making possible a superior gradation display with high brightness.

A video printer for writing data in a Polaroid film was test produced using the liquid crystal shutter according to this invention. Even when driven with a low voltage of 10 V, a superior contrast and gradation display were made possible, thereby producing a full-color image print of high quality.

As described above, by using the upper polarizing plate 9, the retardation film 13 having a retardation value of 0.01 to 0.1 μm, the liquid crystal element 11 having a twist angle of 180° to 260° and the lower polarizing plate 8 in this way, a liquid crystal shutter high in contrast and response speed even with a low drive voltage of 10 V or less can be provided.

Instead of the liquid crystal element 11 having a twist angle of 240° used in the first embodiment, the use of a liquid crystal element having a twist not less than 180° to 260° in twist angle can produce a similar effect. A basically similar effect is obtained also for a twist angle of 270° or more although it is difficult to orient the liquid crystal stably.

Also, according to the first embodiment, a biaxial extension of the polycarbonate film in X and Y directions is used as a retardation film 13. Nevertheless, a normal uniaxial extension of a retardation film can alternatively be used although a small retardation value cannot be adjusted easily. Further, it is also possible to use a retardation film of a Z type extended along Z axis.

Further, unlike the first embodiment in which the retardation film 13 is arranged between the liquid crystal element 11 and the upper polarizing plate 9, the retardation film 13 can alternatively be arranged between the liquid crystal element 11 and the lower polarizing plate 8 with exactly the same effect.

Embodiment 2

The effects of a liquid crystal shutter according to the second embodiment of the present invention will be explained with reference to the drawings. The liquid crystal shutter according to the second embodiment is configured differently from the first embodiment in that two retardation films 2 are used as an optical compensator (Refer to FIGS. 4, and 15, 16 of FIG. 17; the configuration of FIG. 17 will be described in detail later with reference to the fourth embodiment), and the angle at which the upper and lower polarizing plates are arranged and the twist pitch P of the nematic liquid crystal are different.

Figure 3:
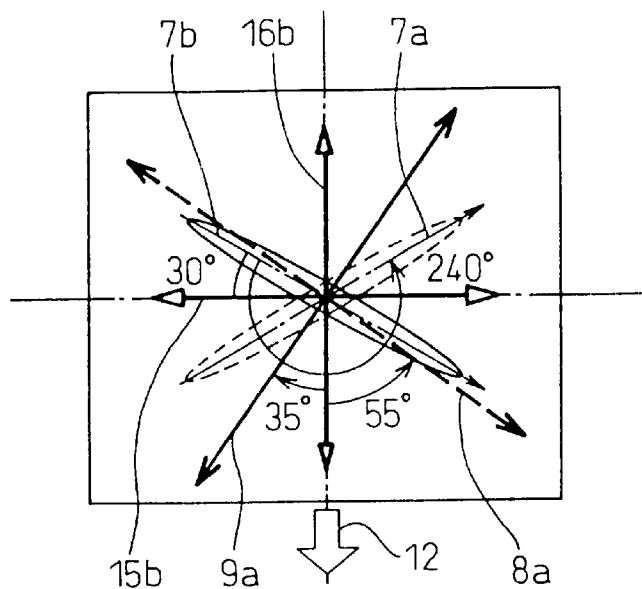
FIG. 3 is a plan view showing the positional relations between the alignment directions of molecules, etc. of the liquid crystal shutter according to a second embodiment of the present invention.
Figure 4:
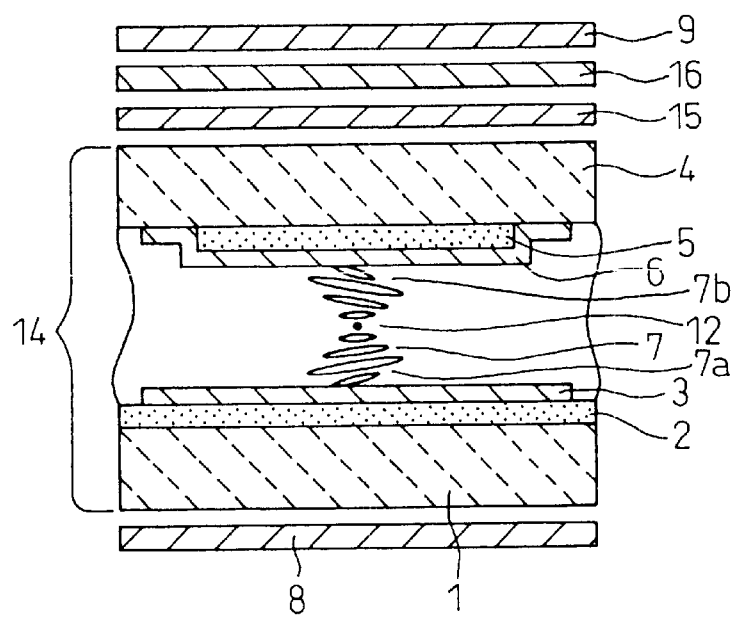
FIG. 4 is a sectional view showing a configuration of a liquid crystal shutter according to the second embodiment of the present invention.

The configuration of the liquid crystal shutter according to the second embodiment of the present invention will be explained with reference to the drawings. FIG. 4 is a sectional view showing the structure of a liquid crystal shutter according to the second embodiment of the invention, and FIG. 3 is a plan view taken from above in FIG. 4. The configuration of the liquid crystal shutter according to the present invention will be explained below with reference to FIGS. 3 and 4.

The liquid crystal shutter according to the second embodiment is configured with a lower polarizing plate 8 arranged under a liquid crystal element 14 having a twist angle of 240°, and a first retardation film 15, a second retardation film 16 and an upper polarizing plate 9 arranged above the liquid crystal element 14. The liquid crystal element 14 is formed of a first substrate 1 of glass 0.7 mm thick having a first electrode 2 of ITO and an alignment layer 3 formed thereon, a second substrate 4 of glass 0.7 mm thick having a second electrode 5 of ITO and an alignment layer 6 formed thereon, and a nematic liquid crystal 7.

The birefringence index Δn of the nematic liquid crystal used is 0.195, and the gap d between the first substrate 1 and the second substrate 4 is 4 μm. Therefore, the Δnd value indicating the birefringence index of the liquid crystal element is set to 0.78 μm.

The alignment layer 3 of the first substrate 1 is rubbed along the alignment direction 7a of the lower liquid crystal molecule in FIG. 3, while the alignment layer 6 of the second substrate 4 is rubbed along the alignment direction 7b of the upper liquid crystal molecule. The nematic liquid crystal having a viscosity of 18 cp has added thereto a substance, having an optical rotatory power, called a chiral material, with the twist pitch P adjusted to 6.15 μm to obtain the relation d/P=0.65, thereby forming a liquid crystal element having a twist angle of 240° counterclockwise.

In order that the absorption axis 8a of the lower polarizing plate and the absorption axis 9a of the upper polarizing plate intersect with each other orthogonally, the lower polarizing plate 8 and the upper polarizing plate 9 are arranged on the two sides, respectively, of the liquid crystal element 14. The absorption axis 8a of the lower polarizing plate is arranged at a counterclockwise angle of 55° to the direction 12 of the central liquid crystal molecule indicating the alignment direction of the liquid crystal at the intermediate portion between the first substrate 1 and the second substrate 4 of the nematic liquid crystal 7, while the absorption axis 9a of the upper polarizing plate is arranged at an angle of 35° clockwise to the direction 12 of the central liquid crystal molecule, thereby forming a liquid crystal shutter of a positive type.

The first retardation film 15 is arranged in such a direction that the lag axis 15b is orthogonal to the direction 12 of the central liquid crystal molecule and has a retardation value of 0.15 μm. The second retardation film 16, on the other hand, has the delay axis 16b thereof arranged parallel to the direction 12 of the central liquid crystal molecule and has a retardation value of 0.18 μm. Both retardation films are a transparent film 50 μm thick having a uniaxial extension of polycarbonate integrated by bonding with the upper polarizing plate 9 using an acrylic adhesive.

Now, the effects of the second embodiment will be explained. First, the effects of using two retardation films will be described. As explained in the first embodiment, it is generally difficult to produce a retardation film having a very small retardation value of about 0.03 to 0.05 μm by an ordinary uniaxial extension method. The first embodiment, therefore, uses a retardation film produced by the more expensive biaxial extension method. The second embodiment, on the other hand, uses two retardation films each having a small retardation value of 0.03 μm to 0.05 μm formed by the inexpensive ordinary uniaxial extension method.

Specifically, in the case where the delay axis 15b of the first retardation film and the delay axis 16b of the second retardation film are arranged in orthogonal relation as shown in FIG. 3, the actual retardation value is provided by difference between the retardation values of the two retardation films.

According to the second embodiment, the second retardation film 16 is set to a retardation value 0.03 μm larger than the first retardation film 15, and therefore substantially the same effect is obtained as if a retardation film having a retardation value of 0.03 μm is arranged on the lag axis 16b of the second retardation film. Thus, like the effects of the first embodiment, a high contrast can be obtained even with a low drive voltage.

Now, the relative positions of the polarizing plates will be explained. As explained in the first embodiment, the maximum transmittance Ym with a voltage applied for a liquid crystal shutter having no retardation film, as shown by the curve 26 in FIG. 7, can be obtained in the case where the angle at which the lower polarizing plate is arranged corresponds to the position of 45° from the direction 12 of the central liquid crystal molecule. With the liquid crystal shutter according to this invention comprising a retardation film having a retardation value of 0.03 μm, however, the maximum transmittance is obtained in the case where the angle at which the lower polarizing plate is arranged corresponds to the position of 55° from the direction 12 of the central liquid crystal molecule. As shown in FIG. 3, therefore, the upper and lower polarizing plates are arranged by being rotated 10° counterclockwise from the position of the liquid crystal shutter according to the first embodiment.

By thus arranging the upper and lower polarizing plates by rotating them by 10°, respectively, though the color with no voltage applied is somewhat yellowish, the brightness at the maximum transmittance Ym with a voltage applied has increased and a superior white color can be obtained.

Figure 14:
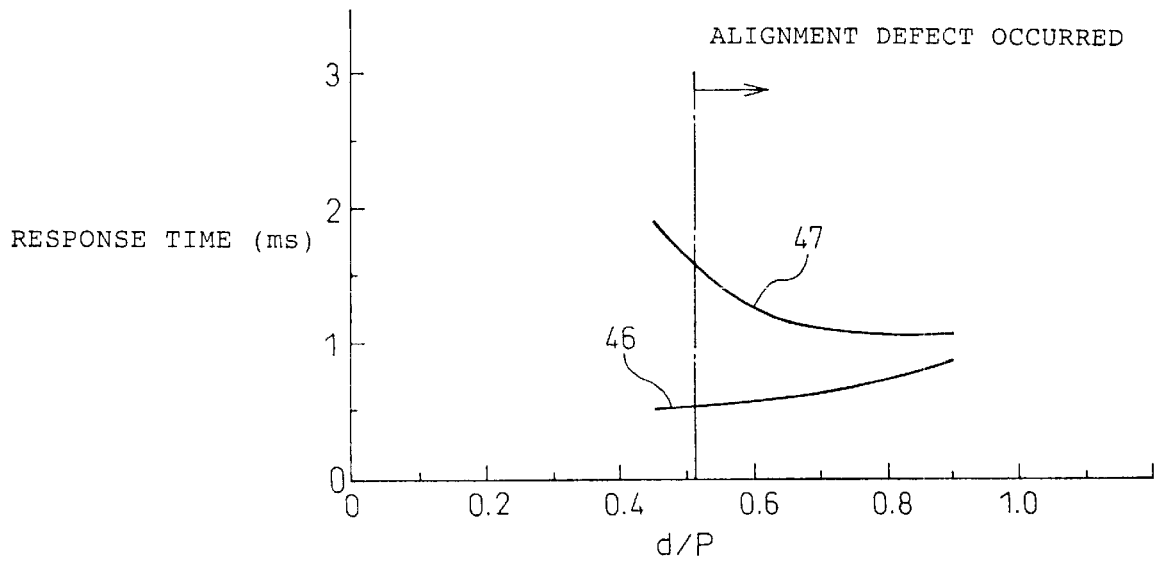
FIG. 14 is a graph showing the relation between the twist pitch and the response time according to the second embodiment of the present invention.

Now, the relation between the twist pitch of the liquid crystal and the response time will be explained. FIG. 14 is a graph showing the relation between d/P which is a quotient between the twist pitch P of the liquid crystal and the gap d between the first substrate 1 and the second substrate 6 on the one hand and the response time at room temperature on the other hand. A solid curve 46 represents the on response time with a voltage of 10 V applied, and a solid curve 47 represents the off response time with a voltage of 0 V. The on response time 46 increases, though not greatly, with the increase in d/P in view of the fact that the viscosity of the liquid crystal increases with the decrease in twist pitch, while the off response time 47 decreases as the return elasticity is strengthened with the increase in d/P.

In an ordinary STN liquid crystal display apparatus having a twist angle of 240°, depending on the tilt angle of the alignment layer used, an increase in the d/P value beyond 0.5 causes an orientation defect called the stripe domain and deteriorates the display quality extremely upon application of a voltage almost equal to the operation start voltage of about 2 V. Thus, the value d/P of the STN liquid crystal display apparatus is often set in the range of 0.45 to 0.5. It has been ascertained experimentally, however, that since the applied voltage of the liquid crystal shutter according to this invention is 10 V or more which is several times as large as the operation starting voltage, the orientation defect is not caused even with a d/P value larger than 0.5.

As a result, the off response time 47 can be shortened by setting d/P to a large value within a range which does not increase the delay of the on response time considerably. If the twist angle is θ, the desired twist angle is obtained up to the value of d/P=(θ+90)/360, and beyond that, the twist angle is the desired twist angle plus 180°. Specifically, in the case where the desired twist angle is 240°, the actual twist angle is 240° up to d/P=0.91, and 420° beyond that.

According to the second embodiment, in order not to increase the on response time excessively, d/P is set in the range of 0.65 to θ/360. In this way, the off response time of the liquid crystal shutter according to the second embodiment can be shortened to 1.2 ms, i.e. to about 80% of the off response time of the liquid crystal shutter according to the first embodiment.

Of course, even when the value of d/P is set to not more than 0.5, the apparatus can be used as a liquid crystal shutter, although the off response time becomes longer. The minimum value of d/P is determined from (θ−90)/360, which is 0.42 for the twist angle of 240°, and 0.25 for the twist angle of 180°. Considering the alignment stability, however, a figure of not less than 0.4 is desirable. Thus, the range of d/P applicable for a liquid crystal shutter is given as 0.4<d/P<(θ+90)/360, the most desirable range being given as 0.5<d/P<θ/360.

As described above, according to the second embodiment, a liquid crystal shutter capable of producing a high contrast even when driven with a low voltage of not more than 10 V can be provided by using the upper polarizing plate 9, the second retardation film 16, the first retardation film 15, the liquid crystal element 14 having a twist angle of 180° to 260° and the lower polarizing plate 8. Further, by optimizing the angle at which the polarizing plates are arranged and setting the twist pitch in the range of 0.5<d/P<θ/360, a liquid crystal shutter which can produce a bright open state with a superior white display and a short response time can be provided.

The second embodiment uses a liquid crystal element 14 having a twist angle of 240°. Nevertheless, a similar effect can be attained by using a liquid crystal element having a twist not less than the twist angle of 180° to 260°. Also, a similar effect can be obtained basically for a twist angle of not less than 270° in which case the liquid crystal cannot be oriented stably.

Also, unlike the second embodiment in which the second retardation film 16 is arranged above the first retardation film 15, the second retardation film 16 can alternatively be arranged under the first retardation film 15 with equal effect.

Further, although the first retardation film 15 and the second retardation film 16 are arranged above the liquid crystal element 14 according to the second embodiment, both the first retardation film 15 and the second retardation film 16 can alternatively be arranged under the liquid crystal element 14.

Figure 17:
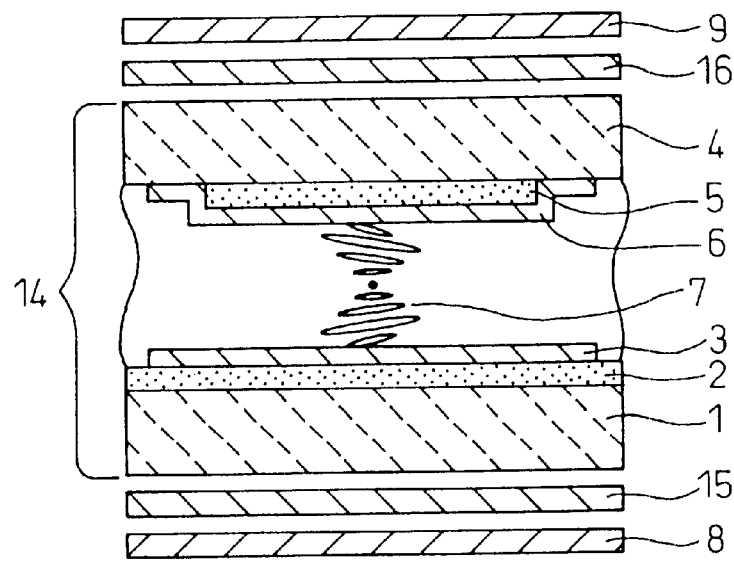
FIG. 17 is a sectional view showing a configuration of a liquid crystal shutter according to the fourth embodiment of the present invention.

Further, unlike the second embodiment 2 in which, as shown in FIG. 17, the first retardation film 15 and the second retardation film 16 are arranged in two successive layers above the liquid crystal element 14, it is alternatively possible to arrange them separately from each other, that is to say, the first retardation film 15 is arranged under the liquid crystal element 14 and the second retardation film 16 above the liquid crystal element 14, or the first retardation film 15 is arranged above the liquid crystal element 14 and the second retardation film 16 under the liquid crystal element 14.

Actually, a liquid crystal shutter was test produced which was configured with, from top to bottom, the upper polarizing plate 9, the second retardation film 16, the liquid crystal element 14, the first retardation film 15 and the lower polarizing plate 8, which liquid crystal shutter had a superior characteristic similar to the liquid crystal shutter according to the second embodiment.

According to the second embodiment, the absorption axis 8a of the lower polarizing plate is arranged at 55° counterclockwise with respect to the direction 12 of the central liquid crystal molecule. Nevertheless, a similar effect can be achieved, in spite of the resulting small change in the angle of field characteristic, by rotating the axis 8a by 90° and arranging the absorption axis 9a of the upper polarizing plate at 55° counterclockwise with respect to the direction 12 of the central liquid crystal molecule.

Also, unlike the second embodiment in which the absorption axis 8a of the lower polarizing plate is arranged at 55° counterclockwise with respect to the direction 12 of the central liquid crystal molecule, substantially superior contrast and brightness characteristics can be obtained within the range of 40° to 60°.

In spite of the fact that the angle at which the absorption axes of the upper and lower polarizing plates intersect with each other is set to 90° in the second embodiment, an intersecting angle in the range of 80° to 100° is applicable as explained with reference to FIG. 8 in the first embodiment, and a superior contrast is obtained preferably in the range of 850° to 950°.

Further, according to the second embodiment, the difference between the retardation value of the second retardation film 16 and the retardation value of the first retardation film 15 is set to 0.03 μm. As explained in the first embodiment, however, a similar effect is obtained by setting the difference between the retardation value of the second retardation film 16 and the retardation value of the first retardation film 15 in the range of 0.01 to 0.1 μm.

Also, unlike the second embodiment using retardation films having retardation values of 0.15 μm and 0.18 μm, respectively, the absolute value of the retardation film used is not specifically limited as long as the difference of the retardation values is in the range of 0.01 to 0.1 μm. For an optical compensator which generally has a large retardation value, however, it is desirable to use a retardation film having a retardation value of not more than 0.5 μm in view of a large manufacturing variation in the retardation value.

Embodiment 3

Now, the configuration of a liquid crystal shutter according to a third embodiment of the present invention will be explained with reference to the drawings. FIG. 2 described above is a sectional view applicable also to the structure of the liquid crystal shutter according to the third embodiment, and FIG. 15 is a plan view taken from above in FIG. 2. Now, the configuration of the liquid crystal shutter according to this invention will be explained with reference to FIGS. 15 and 2. The third embodiment refers to the case where a single discotic film is used as an optical compensator 13.

The alignment layer 3 of the first substrate 1 is rubbed along the arrow in the direction 7a of orientation of the lower liquid crystal molecule also in FIG. 15, and the alignment layer 6 of the second substrate 4 is rubbed along the arrow in the alignment direction 7b of the upper liquid crystal molecule. The liquid crystal molecules are aligned along the alignment direction 7b of the upper liquid crystal molecule and the alignment direction 7a of the lower liquid crystal molecule, and the liquid crystal molecules on the arrow side are inclined outward of the substrates.

The alignment direction 13c of the discotic film 13 making up an optical compensator is orthogonal to the direction 12 of the central liquid crystal molecule according to the third embodiment. Wide View (trade name) of Fuji Film having a retardation value of 0.03 μm against the light incident from the front was arranged parallel to the horizontal axis h located in the direction of 3 o'clock in FIG. 15. The discotic film 13, as shown in FIG. 20, includes discotic structured compounds 37 fixedly aligned in the alignment direction 13c on a transparent film 36 of triacetyl cellulose (TAC) 80 μm thick. The discotic structured compounds 37 have progressively different inclination angles along the thickness. This, the discotic structure compound 37c farthest from the transparent film 36 is inclined by 500° to 70° with respect to the alignment direction 13c.

In the discotic film 13, the direction in which the refractive index becomes maximum against the light entering from the front is orthogonal to the alignment direction 36, and corresponds to the delay axis of an ordinary optical compensator. The angle α formed between the alignment direction 13a of the optical compensator and the absorption axis 9a of the upper polarizing plate is 45° and provides a position most likely to cause a retardation. The transparent film 36 of the discotic film 13 and the upper polarizing plate 9 are integrated with each other by an acrylic adhesive, and the discotic structured compound is also coated with the acrylic adhesive and bonded with the liquid crystal element 11.

Specifically, with a voltage of 10 V applied to the liquid crystal element 11, the great majority of the liquid crystal molecules stand upright perpendicular to the substrate, while the liquid crystal molecules on the boundary of the substrates are parallel to the substrates and slightly retain a birefringence characteristic. In this case, the molecules on the boundary surface of the substrates are oriented in the alignment direction 7a of the upper liquid crystal molecule and in the alignment direction 7b of the lower liquid crystal molecule in FIG. 15, and on the average, are arranged orthogonal to the direction 12 of the central liquid crystal molecule, i.e. in the direction parallel to the horizontal axis h in FIG. 15.

Thus, the alignment direction 13c of the discotic film is arranged along the direction of the horizontal axis providing the average alignment direction of the liquid crystal. In this way, substantially the same situation is achieved as if an optical compensator having a retardation value of 0.03 μm is arranged parallel to the direction 12 of the central liquid crystal molecule, thus the remaining birefringence characteristic can be completely eliminated. Specifically, the contrast with a low drive voltage can be improved by arranging the alignment direction 13c of the discotic film 13 at a position orthogonal to the direction 12 of the central liquid crystal molecule.

Now, the retardation value of the discotic film 13 will be explained. FIG. 6 described above shows the relation between the retardation value and the contrast for the light incident from the front with the varying inclination angle of the discotic structured compounds 37 of the discotic film 13 while a constant voltage is applied to the liquid crystal shutter according to this embodiment. As described above, the dotted curve 23 refers to the case in which the applied voltage is 20 V, the solid curve 24 to the case where the applied voltage is 10 V, and the one-dot chain curve 25 to the case where the applied voltage is 5 V. This graph was explained in detail above with reference to the first embodiment, and will not be explained in the third embodiment.

FIG. 8 described above is a graph indicating the relation between the contrast and the angle at which the absorption axes of the upper and lower polarizing plates intersect with each other. As in the case of FIG. 1, the upper and lower polarizing plates were relocated equally from the position shown in FIG. 15. As indicated by the curve 35, the highest contrast could be obtained in the case where the absorption axes of the upper and lower polarizing plates intersect with each other at 90°.

In the case where the liquid crystal shutter according to the present invention is applied to a field sequential color display apparatus in which light sources of a plurality of colors are sequentially turned on at intervals of 5 to 6 ms so that only the desired color of light is transmitted using the liquid crystal shutter to make possible multicolor display as described above, the color with no voltage applied is important, and the color can be adjusted effectively by reducing the angle at which the absorption axes of the upper and lower polarizing plates intersect with each other to about 85°. As indicated by the curve 35 shown in FIG. 8, however, once the angle at which the polarizing plates intersection with other is reduced to 80° or less or increased up to 100° or more, a perfect black cannot be obtained and the contrast is reduced. The applicable angle at which the polarizing plates intersect with each other, therefore, is in the range of 80° to 100° or preferably in the range of 850° to 95°

Also in the case where the discotic film 13 is arranged orthogonally to the direction 12 of the central liquid crystal molecule as in the third embodiment, as in the first embodiment, the retardation is added and the white color becomes somewhat yellowish when no voltage is applied. Therefore, the white color can be improved by reducing the value Δnd of the liquid crystal element 11 by about 0.02 to 0.05 μm from the Δnd value for the liquid crystal element 10 of the liquid crystal shutter having no optical compensator. The Δnd value recommended for the liquid crystal element 11 according to this invention is in the range of 0.6 μm to 0.9 μm, or especially, the range of 0.65 μm to 0.8 μm is preferable. The most optimum Δnd value, though somewhat dependent on the twist angle of the liquid crystal element 11 and the retardation value of the discotic film 13, is included substantially in the range of 0.6 to 0.9 μm for the twist angle of 180° to 260°.

Also, with regard to the response time of the liquid crystal shutter according to the third embodiment, as described with reference to FIG. 10 above and as in the first embodiment, the on response time 43 is very short and was less than 1 ms while the off response time 44 was 1.5 ms, thereby making it possible to produce a liquid crystal shutter with a high response speed.

Further, as in the first embodiment, a superior gradation display is obtained, and as described above, a gradation display and a superior contrast are attained even with a low voltage of 10 V in a similar video printer to the one described above, thereby making it possible to produce a full-color image print of high image quality.

Also, according to the third embodiment, the use of a discotic structured compound film (discotic film) as an optical compensator stabilizes the very small retardation value of the optical compensator, thereby making it possible to provide a liquid crystal shutter with small variations of characteristics.

Further, according to the third embodiment, the direction 13c of orientation of the discotic film 13 is arranged in the direction of 3 o'clock on the horizontal axis h. Nevertheless, a similar effect can be obtained by arranging the alignment direction 13c in the direction of 9 o'clock on the horizontal axis h, though accompanied it is by a somewhat different angle of field characteristic.

In the third embodiment, as in the first embodiment, the discotic film 13 can be arranged between the liquid crystal element 11 and the lower polarizing plate 8 instead of between the liquid crystal element 11 and the upper polarizing plate 9 with quite the same effect.

Further, in order to increase the retardation value of the discotic film 13, two discotic films 13 may be used in two successive layers in the same direction, or one discotic film 13 may be arranged between the liquid crystal element 11 and the upper polarizing plate 9 and the other discotic film 13 between the liquid crystal element 11 and the lower polarizing plate 8 in the same direction.

Embodiment 4

The configuration and effects of the liquid crystal shutter according to a fourth embodiment of the present invention will be explained with reference to the drawings. The configuration of the liquid crystal shutter according to the fourth embodiment is different from that of the aforementioned embodiments in that two optical compensators are used like in the second embodiment and the twist pitch P of the nematic liquid crystal assumes a different value. In the fourth embodiment, however, two discotic films are used as optical compensators.

The configuration of the liquid crystal shutter according to the fourth embodiment will be explained with reference to the drawings. FIG. 17 is a sectional view showing the structure of the liquid crystal shutter according to the fourth embodiment of the invention, and FIG. 16 a plan view taken from above in FIG. 17. The configuration of the liquid crystal shutter according to this invention will be explained with alternate reference to FIGS. 16 and 17.

The liquid crystal shutter according to the fourth embodiment is configured with a first discotic film 15 and a lower polarizing plate 8 arranged under the liquid crystal element 14 having a twist angle of 240°, and a second discotic film 16 and an upper polarizing plate 9 arranged above the liquid crystal element 11. The liquid crystal element 14 is formed of a first substrate 1 of glass 0.7 mm thick with a first electrode 2 of ITO and an alignment layer 3 formed thereon, a second substrate 4 of glass 0.7 mm thick with a second electrode 5 of ITO and an alignment layer 6 formed thereon, and a nematic liquid crystal element 7.

The birefringence index $\Delta n$ of the nematic liquid crystal used is 0.195, and the gap d between the first substrate 1 and the second substrate 4 is 4 nm. The $\Delta nd$ value indicating the birefringence characteristic as a liquid crystal element 14, therefore, is set to 0.78 $\mu$m.

Figure 16:
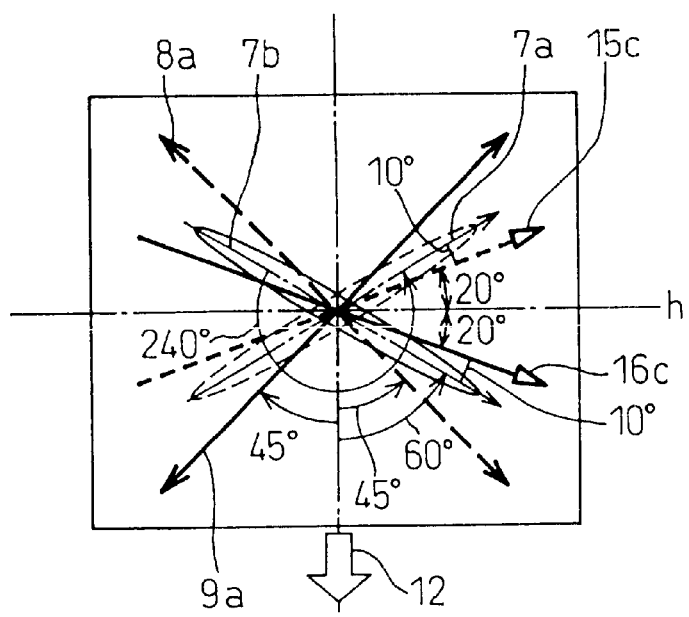
FIG. 16 is a plan view showing the positional relations of the alignment directions of molecules, etc. of a liquid crystal shutter according to a fourth embodiment of the present invention.

The alignment layer 3 of the first substrate 1 is rubbed along the arrow in the alignment direction 7a of the lower liquid crystal molecule in FIG. 16, while the alignment layer 6 of the second substrate 4 is rubbed along the arrow in the alignment direction 7b of the upper liquid crystal molecule. The liquid crystal molecules are aligned in the alignment direction 7b of the upper liquid crystal molecule and the alignment direction 7a of the lower liquid crystal molecule, so that the liquid crystal molecules on the arrow side are inclined outward of the substrates. A substance having the optical rotatory power called a chiral material is added to the nematic 1 having a viscosity of 18 cp, and the twist pitch P is adjusted to 6.15 $\mu$m to assume the relation d/P=0.65, thereby forming a liquid crystal element having a twist angle of 240° counterclockwise.

The lower polarizing plate 8 and the upper polarizing plate 9 are arranged on the two sides, respectively, of the liquid crystal element 14 in such a manner that the absorption axis 8a of the lower polarizing plate and the absorption axis 9a of the upper polarizing plate are orthogonal to each other. The absorption axis 8a of the lower polarizing plate is arranged at an angle of 45° counterclockwise with respect to the direction 12 of the central liquid crystal molecule indicating the alignment direction of liquid crystal at the intermediate portion between the first substrate 1 and the second substrate 4 of the nematic liquid crystal 7, while the absorption axis 9a of the upper polarizing plate is arranged at an angle of 45° clockwise with respect to the direction of the central liquid crystal molecule, thereby making up a liquid crystal shutter of positive type.

The first discotic film 15 has the alignment direction 15c thereof arranged at 20° counterclockwise from the horizontal axis h, and has a front retardation value of 0.03 $\mu$m. The second discotic film 16, on the other hand, has the alignment direction 16c arranged at 20° clockwise from the horizontal axis h, and has a retardation value of 0.03 $\mu$m. Both discotic films are made of the same material as the discotic film 13 used in the third embodiment described above, and include a transparent film 36 and polarizing plates bonded to each other by an acrylic adhesive, with the coating surface of the discotic structured compounds 37 and the liquid crystal element 14 bonded to each other using an acrylic adhesive.

Now, the effects of the fourth embodiment will be explained. First, an explanation will be given of the angle at which the discotic film is arranged. According to the third embodiment, the alignment direction 13c of the discotic film 13 is arranged parallel to the horizontal axis h. In the fourth embodiment, on the other hand, the alignment direction of each discotic film is arranged at 20° rotated in the alignment direction of the liquid crystal molecules on the substrate side associated with the particular discotic film.

Specifically, as shown in FIG. 16, the angle formed between the alignment direction 15c of the first discotic film 15 and the horizontal axis h is set to 20°, and the angle formed between the alignment direction 16c of the second discotic film 16 and the horizontal axis h is set to 20°.

Further, the angle between the alignment direction 15c of the first discotic film 15 and the alignment direction 7a of the lower liquid crystal molecule is 10°, while the angle formed between the alignment direction 15c of the first discotic film is and the alignment direction 7b of the upper liquid crystal molecule is not more than 50°. Also, the angle formed between the alignment direction 16c of the second discotic film 16 and the alignment direction 7b of the upper liquid crystal molecule is 10°, while the angle between the alignment direction 16c of the second discotic film 16 and the alignment direction 7a of the lower liquid crystal molecule is not more than 50°.

As explained in the third embodiment above, as long as a voltage of about 10 V is applied to the liquid crystal element 14, almost all liquid crystal molecules stand perpendicular to the substrates, while the liquid crystal molecules on the boundary surface of the substrates remain still parallel to the substrates and therefore retain a slight amount of birefringence characteristic, so that the average alignment direction of the liquid crystal molecules is parallel to the horizontal axis h.

The remaining birefringence characteristic can be removed most efficiently in the case where the alignment direction of the discotic film is parallel to the horizontal axis h. Nevertheless, the birefringence characteristic can be eliminated up to the angle of 0° to 40° to the horizontal axis h. At the angles of 50° to 90° to the horizontal axis, in contrast, the retardation of the discotic film is added to the residual birefringence characteristic of the liquid crystal element. According to the fourth embodiment, two discotic films having a retardation value of 0.03 $\mu$m are used. In the case where they are both arranged parallel to the horizontal axis h, therefore, the retardation value becomes 0.06 $\mu$mm. Thus, a contrast of only about 20 can be obtained as indicated by the curve 24 in FIG. 6 with a voltage of 10 V.

In view of this, as in the fourth embodiment, the angle at which the discotic films are arranged is changed by about 0° to 30°, and then the total retardation value corrected by the two discotic films is reduced to 0.02 to 0.03 $\mu$m, thereby making it possible to obtain a contrast of not less than 80 with a drive voltage of 10 V.

If the alignment direction 15c of the first discotic film 15 is set to the range of 90° to 120° counterclockwise with respect to the direction 12 of the central liquid crystal molecule, i.e. to the range of 0° to 300° counterclockwise from the horizontal axis h, the alignment direction 15c becomes substantially parallel to the alignment direction 7a of the lower liquid crystal molecule, more desirably resulting in an improved angle of field characteristic.

Specifically, the contrast can be improved in the case where the alignment direction 15c of the first discotic film 15 is in the range of 600° to 120° counterclockwise with respect to the direction 12 of the central liquid crystal molecule, and the angle of field characteristic can also be improved in the range of 90° to 120°. In similar fashion, in the case where the alignment direction 16 of the second discotic film 16 is arranged at the angle in the range of 600° to 900° counterclockwise with respect to the direction 12 of the central liquid crystal molecule, i.e. in the range of 0° to 30° clockwise from the horizontal axis h, then the direction 16c substantially becomes parallel to the alignment direction 7b of the upper liquid crystal molecule, more desirably resulting in an improved angle of field characteristic.

This effect of an improved angle of field characteristic is obtained because, in the case where the visual angle is inclined in the alignment direction 13c (See FIG. 20) of the discotic film 13, the retardation values of the retardation films change asymmetrically and correct the birefringence characteristic generated in the liquid crystal element. This effect is similar to the effect obtained when the retardation film is used with the conventional liquid crystal display apparatus described with reference to FIG. 19. Nevertheless, the conventional liquid crystal display apparatus presupposes that the angle formed between the absorption axis 9a of the upper polarizing plate and the alignment direction 16c of the second discotic film 16 is set to the range of 0° or 90° in order to avoid the effect of the retardation on the front of the retardation film, and is considerably different in configuration from the present invention in which the retardation is utilized positively.

The relation between the twist pitch of the liquid crystal and the time in the fourth embodiment is similar to that explained with reference to FIG. 14 above, and therefore will not be described in detail. Also in the fourth embodiment, the applied voltage of the liquid crystal shutter is not less than 10 V and is several times larger than the operation start voltage, and it has been experimentally ascertained that even in the case where the d/P value is larger than 0.5, no orientation defect occurs. Further, the off response time for the liquid crystal shutter according to the third embodiment described above could be shortened to about 80%.

Also, a field sequential color display apparatus has been test produced with the liquid crystal shutter according to the present invention, in which three types of light-emitting diodes of red, green and blue are sequentially turned on at intervals of 5 ms so that only the desired color is transmitted by use of the liquid crystal shutter for multicolor display. As a result, a beautiful "color tone" high in contrast can be obtained even with a low drive voltage of 10 V, and also a display with a superior angle of field characteristic could be realized.

As described above, according to the fourth embodiment of the invention using the upper polarizing plate 9, the second discotic film 16, the liquid crystal element 14 having a twist angle of 180° to 260°, the first discotic film 15 and the lower polarizing plate 8, there is provided a liquid crystal shutter which can produce a high contrast even when driven with a low voltage of not more than 10 V. Further, by optimizing the angle at which the discotic films are arranged, a wide angle of field characteristic is obtained, thereby providing a liquid crystal shutter most suitable for the field sequential color display apparatus.

Although the fourth embodiment in which the absorption axis 8a of the lower polarizing plate is arranged at 45° counterclockwise with respect to the direction 12 of the central liquid crystal molecule, the absorption axis 8a of the lower polarizing plate may alternatively be turned by 90° while the absorption axis 9a of the upper polarizing plate is arranged at 45° counterclockwise with respect to the direction 12 of the central liquid crystal molecule to produce a similar effect, though accompanied by some change in the angle of field characteristic.

Also, according to the fourth embodiment, the absorption axis 8a of the lower polarizing plate is arranged at 45° counterclockwise with respect to the direction 12 of the central liquid crystal molecule. Nevertheless, a substantially superior contrast and brightness characteristics can be obtained by arranging the absorption axis 8a in the range of 40° to 60°.

Further, in spite of the fact that the retardation value of the second discotic film 16 and the retardation value of the first discotic film 15 are set to 0.03 $\mu$m according to the fourth embodiment, a similar effect can be obtained by setting the retardation value of both discotic films in the range of 0.01 $\mu$m to 0.1 $\mu$m, as explained in the third embodiment, even though the optimum range is somewhat varied with the drive voltage.

Furthermore, instead of setting the $\Delta$nd value of the liquid crystal element 14 to 0.78 $\mu$m as in the fourth embodiment, a similar effect can be obtained by setting the $\Delta$nd value in the range of 0.6 to 0.9 $\mu$m as explained in the third embodiment.

INDUSTRIAL APPLICABILITY

As will be apparent from the foregoing description, according to this invention, there is provided a liquid crystal shutter of high brightness and contrast which can be driven with a voltage as low as not more than 10 V and has a high on/off response speed. The use of the liquid crystal shutter according to the present invention with a simplified drive circuit can reduce the cost and power consumption, thereby making possible application to portable equipment driven by a battery. Also, since the angle at which the two optical compensators (retardation films or discotic films) are arranged is optimized, a high contrast can be achieved with a low drive voltage like in the aforementioned case, thereby providing a liquid crystal shutter with an even more superior angle of field characteristic. Thus, the present invention has a very great industrial applicability.

What is claimed is:

1. A liquid crystal shutter comprising a liquid crystal element composed of a nematic liquid crystal having a twist angle of 180° to 260° held between a pair of substrates including a first substrate and a second substrate, a pair of polarizing plates arranged with said liquid crystal element held therebetween, and an optical compensator arranged between said liquid crystal element and one of said polarizing plates, characterized in that the angle formed between the absorption axes of said pair of said polarizing plates is set in the range of 80° to 100°, the angle formed between the absorption axis of said one of the polarizing plates and the direction of the central liquid crystal molecule of said liquid crystal element is set in the range of 40° to 60°, and the delay axis of said optical compensator is arranged substantially parallel to the direction of the central liquid crystal molecule of said liquid crystal element.

2. A liquid crystal shutter as set forth in claim 1, characterized in that the retardation value on the front of said optical compensator is set in the range of 0.01 to 0.1 $\mu$m.

3. A liquid crystal shutter as set forth in claim 1 or 2, characterized in that the value $\Delta$nd which is the product of the birefringence index $\Delta$n of the nematic liquid crystal and the gap d between the first substrate and the second substrate is set in the range of 0.6 to 0.9 $\mu$m.

4. A liquid crystal shutter as set forth in claim 1, characterized in that said optical compensator is a retardation film, and the delay axis of said optical compensator has the same direction as the delay axis of said retardation film.

5. A liquid crystal shutter as set forth in claim 1, characterized in that said optical compensator is a discotic film including discotic structured compounds aligned on a transparent film with the inclination angle varying along the thickness, and the delay axis of said optical compensator is an optical axis orthogonal to the alignment direction of said discotic film.

6. A liquid crystal shutter comprising a liquid crystal element composed of a nematic liquid crystal having a twist angle of 180° to 260° held between a pair of substrates including a first substrate and a second substrate, a pair of polarizing plates arranged with said liquid crystal element held therebetween, and a first optical compensator and a second optical compensator arranged between said liquid crystal element and one of said pair of the polarizing plates, characterized in that the angle formed between the absorption axes of said pair of said polarizing plates is set in the range of 80° to 100°, and the angle formed between the absorption axis of said one of the polarizing plates and the direction of the central liquid crystal molecule of said liquid crystal element is set in the range of 40° to 60°.

7. A liquid crystal shutter comprising a liquid crystal element composed of a nematic liquid crystal having a twist angle of 180° to 260° held between a pair of substrates including a first substrate and a second substrate, a pair of polarizing plates arranged with said liquid crystal element held therebetween, a first optical compensator arranged between said liquid crystal element and one of said polarizing plates, and a second optical compensator arranged between said liquid crystal element and the other polarizing plate, characterized in that the angle formed between the absorption axes of said pair of said polarizing plates is set in the range of 80° to 100°, and the angle formed between the absorption axis of said one of the polarizing plates and the direction of the central liquid crystal molecule of said liquid crystal element is set in the range of 40° to 60°.

8. A liquid crystal shutter as set forth in claim 6 or 7, characterized in that the difference of the retardation value on the front of said first optical compensator and the front of said second optical compensator is set in the range of 0.01 to 0.1 μm.

9. A liquid crystal shutter as set forth in claim 6 or 7, characterized in that the value Δnd which is the product of the birefringence index Δn of the nematic liquid crystal and the gap d between said first substrate and said second substrate is set in the range of 0.6 to 0.9 μm.

10. A liquid crystal shutter as set forth in any of claims 1 to 9, characterized in that said liquid crystal element has a twist angle of θ, and the value d/P which is a quotient between the twist pitch P of said nematic liquid crystal and the gap d between said first substrate and said second substrate is set in the range of 0.5 to θ/360.

11. A liquid crystal shutter as set forth in claim 6 or 7, characterized in that said first optical compensator is a first retardation film, said second optical compensator is a second retardation film, the delay axis of said first retardation film is arranged substantially orthogonal with the direction of the central liquid crystal molecule of said liquid crystal element, and the delay axis of said second retardation film is arranged substantially parallel to the direction of the central liquid crystal molecule of said liquid crystal element.

12. A liquid crystal shutter as set forth in claim 7, characterized in that each of said first optical compensator and said second optical compensator is a discotic film composed of discotic structured compounds aligned on a transparent film with an inclination angle varied along the thickness, one of said polarizing plates is an upper polarizing plate, the other being a lower polarizing plate, said first optical compensator making up a first discotic film, and said first discotic film is interposed between said lower polarizing plate and said liquid crystal element;

the direction orthogonal to the direction of the central liquid crystal molecule of said liquid crystal element is assumed to be a horizontal axis, the angle formed between the alignment direction of said first discotic film and said horizontal axis is set in the range of 0° to 30°, and the angle formed between the alignment direction of said first discotic film and the alignment direction of the lower liquid crystal molecule is not more than the angle formed between the alignment direction of said first discotic film and the alignment direction of the upper liquid crystal molecule;

said second optical compensator is a second discotic film, and said second discotic film is interposed between said upper polarizing plate and said liquid crystal element; and the angle formed between the alignment direction of said second discotic film and said horizontal axis is set in the range of 0° to 30°, and the angle formed between the alignment direction of said second discotic film and the alignment direction of said upper liquid crystal molecule is not more than the angle formed between the alignment direction of said second discotic film and the alignment direction of said lower liquid crystal molecule.

* * * * *